United States Patent
McConnell et al.

(10) Patent No.: US 10,833,917 B1
(45) Date of Patent: Nov. 10, 2020

(54) LIVE MONITORING TO TRIGGER AUTOMATION IN ADMINISTERING COACHING

(71) Applicant: INTRADIEM INC., Alpharetta, GA (US)

(72) Inventors: Matthew Grady McConnell, Johns Creek, GA (US); Christopher Powell Busbee, Marietta, GA (US); Kevin Wilson, Bradenton, FL (US); Eric Victor Drucker, Roswell, GA (US); Jennifer Christine East, Milton, GA (US); Michael Carl Jarus, Suwanee, GA (US)

(73) Assignee: INTRADIEM INC., Alpharetta, GA (US)

( * ) Notice: Subject to any disclaimer, the term of this patent is extended or adjusted under 35 U.S.C. 154(b) by 0 days.

(21) Appl. No.: 16/912,351

(22) Filed: Jun. 25, 2020

Related U.S. Application Data

(63) Continuation of application No. 16/804,376, filed on Feb. 28, 2020, which is a continuation of application No. 16/580,258, filed on Sep. 24, 2019, now Pat. No. 10,623,233.

(51) Int. Cl.
| | | |
|---|---|---|
| *G06F 15/173* | (2006.01) | |
| *H04L 12/24* | (2006.01) | |
| *H04L 29/06* | (2006.01) | |
| *G06F 9/54* | (2006.01) | |

(52) U.S. Cl.
CPC .............. *H04L 41/046* (2013.01); *G06F 9/54* (2013.01); *H04L 63/08* (2013.01)

(58) Field of Classification Search
CPC ...................................................... H04L 41/046
USPC ........................................ 709/203, 223–225
See application file for complete search history.

(56) References Cited

U.S. PATENT DOCUMENTS

| | | | |
|---|---|---|---|
| 6,628,777 B1 * | 9/2003 | McIllwaine | G06Q 10/06 379/265.01 |
| 8,488,769 B1 * | 7/2013 | Noble, Jr. | H04M 3/5175 379/265.02 |
| 8,767,948 B1 | 7/2014 | Riahi et al. | |
| 8,938,063 B1 | 1/2015 | Hackbarth et al. | |
| 2005/0135601 A1 | 6/2005 | Whitman | |
| 2008/0123839 A1 * | 5/2008 | McCormack | H04M 3/523 379/265.02 |

(Continued)

*Primary Examiner* — Duyen M Doan
(74) *Attorney, Agent, or Firm* — McDonnell Boehnen Hulbert & Berghoff LLP

(57) ABSTRACT

A system may include one or more processors disposed within a management network. An end-user network may contain agent instances and one or more servers, where the one or more servers are operable to: (i) receive communications to the end-user network, and (ii) assign agent instances to service the communications. The one or more processors may be configured to perform one or more tasks. These tasks may include receiving, from the end-user network, data associated with the processes of the one or more servers; determining, based on a specification, operations to be performed by the one or more servers, wherein the specification is defined by the end-user network and comprises logical directives, each directive containing conditions that, if satisfied by the received data, define the operations; and providing, to the one or more servers, the operations.

20 Claims, 26 Drawing Sheets

(56) References Cited

U.S. PATENT DOCUMENTS

| | | | |
|---|---|---|---|
| 2015/0092936 A1* | 4/2015 | Riefel | G06Q 40/04 379/265.03 |
| 2016/0094411 A1 | 3/2016 | Brennan et al. | |
| 2019/0207815 A1 | 7/2019 | Kirner et al. | |

* cited by examiner

1000 — PROVIDING, BY ONE OR MORE PROCESSORS DISPOSED WITHIN A MANAGEMENT NETWORK AND TO AGENT INSTANCES IN AN END-USER NETWORK, A MONITORING APPLICATION, WHERE THE MANAGEMENT NETWORK HAS COMPUTING RESOURCES DEDICATED TO THE END-USER NETWORK, WHERE THE END-USER NETWORK CONTAINS THE AGENT INSTANCES AND ONE OR MORE SERVERS, WHERE THE ONE OR MORE SERVERS ARE OPERABLE TO: (I) RECEIVE INCOMING COMMUNICATIONS, AND (II) ASSIGN ONE OR MORE AGENT INSTANCES TO SERVICE THE INCOMING COMMUNICATIONS, AND WHERE THE MONITORING APPLICATION IS CONFIGURED TO STORE, IN A COMPUTER READABLE MEDIUM, INFORMATION ASSOCIATED WITH DATA RECEIVED BY THE AGENT INSTANCES FROM THE ONE OR MORE SERVERS.

1010 — RECEIVE, AT THE MANAGEMENT NETWORK AND FROM THE MONITORING APPLICATION, THE STORED INFORMATION.

1020 — TRANSMIT, TO A RULES ENGINE ASSOCIATED WITH THE END-USER NETWORK, THE STORED INFORMATION.

LIVE MONITORING TO TRIGGER AUTOMATION IN ADMINISTERING COACHING

CROSS-REFERENCE TO RELATED APPLICATIONS

The present application is a continuation of U.S. patent application Ser. No. 16/804,376, filed Feb. 28, 2020, which is a continuation of U.S. patent application Ser. No. 16/580,258, filed Sep. 24, 2019, now U.S. Pat. No. 10,623,233. The entire disclosure contents of these applications are herewith incorporated by reference into the present application.

BACKGROUND

To resolve customer issues with products and/or services, enterprises typically employ the services of a contact center. The contact center may be staffed with agents (e.g., customer-facing employees or contractors of the contact center) trained to resolve a myriad of customer issues. In some cases, the contact center may be operated by the enterprise, while in the other cases the contact center may be operated by a $3^{rd}$-party entity hired by the enterprise.

SUMMARY

In a first example embodiment, a system may include one or more processors disposed within a management network, where the management network has computing resources dedicated to an end-user network. The end-user network may contain agent instances and one or more servers, where the one or more servers are operable to: (i) receive communications to the end-user network, and (ii) assign agent instances to service the communications. The one or more processors may be configured to perform one or more tasks. These tasks may include receiving, from the end-user network, data associated with the processes of the one or more servers. The tasks may also include determining, based on a specification, operations to be performed by the one or more servers, where the specification is defined by the end-user network and comprises logical directives, each directive containing conditions that, if satisfied by the received data, define the operations. The tasks may also include providing, to the one or more servers, the operations.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various components for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B is a screen shot diagram illustrating a condition specification pane of a rule design tool, in accordance with example embodiments.

FIG. 7C is a screen shot diagram illustrating a second portion of a condition specification pane of a rule design tool, in accordance with example embodiments.

FIG. 10 is a flow chart illustrating an example embodiment.

DETAILED DESCRIPTION

Figure 1:
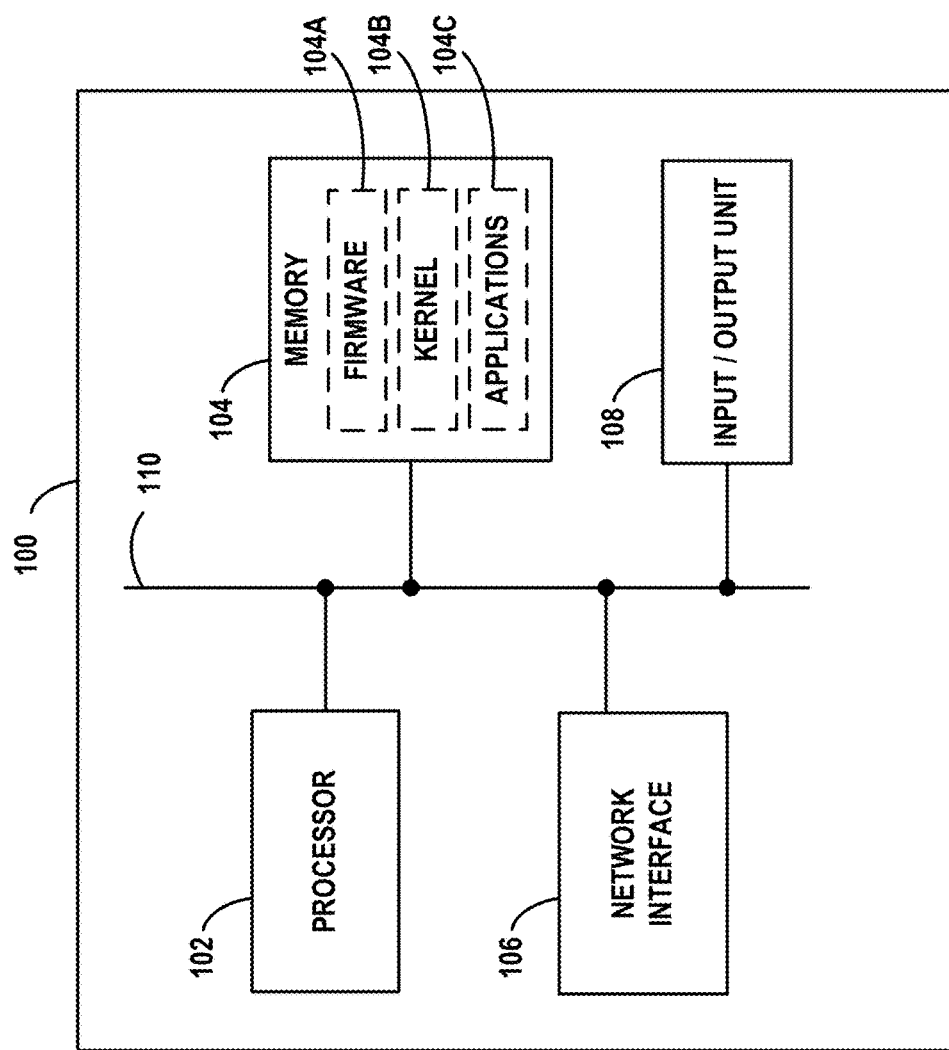
FIG. 1 is a block drawing illustrating a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Contact centers often use off-the-shelf software applications and hardware components, such as automatic call distributors (ACDs) and workforce management (WFM) packages, to manage the distribution of incoming communications to agent instances and to establish schedules for the agent instances based on influxes in communication requests. While such software applications provide some benefits, many (if not all) fail to impart contact centers with the capability to logically adjust operations to address unpredictable events. For example, if agent instances frequently become idle due to low incoming communication volume, an advantageous adjustment may be to provide agent instances with training modules to occupy the downtime.

Typically, adjustments are manually implemented by a contact center's administrative team. But as the number of customer communications grows or the size of the contact center expands, the ability for the administrative team to consistently and accurately adjust operations may be limited. Moreover, the contact center may find it difficult or prohibitively expensive to ascertain the exact adjustments that should occur due to lack of a single system that unifies its subsystems and data.

Consequently, the contact center may benefit from a remotely-hosted service that eliminates this complexity. The goal of such a service would be to reduce time-consuming, manual administrative tasks so that the contact center can focus on providing high levels of customer support.

In order to achieve this goal, a management network is provided to intelligently perform operations on behalf of a contact center. The management network may act as a Software as a Service (SaaS) platform hosted remotely from the contact center, but may access data, applications, and services within the contact center's network by way of secure connections. Such a management network may have a number of advantageous capabilities and characteristics. These advantages and characteristics may improve the contact center's processes and customer service.

In one aspect, the management network may support the ability to configure the behavior of contact center operations using logical directives. This allows the management network to be rapidly adapted by the contact center to meet specific needs. Further, the management network may support Graphical User Interface (GUI) tools that facilitate the creation and management of the logical directives. Such an approach reduces setup time and increases flexibility.

In another aspect, the management network may support a rich set of integration features to interact with legacy applications and third-party applications. For instance, the management network may support a custom onboarding system that integrates with legacy WFM, ACD, and other systems within the contact center.

In yet another aspect, the management network may support enterprise-grade security and may utilize security procedures upon interacting with systems in the contact center and services hosted outside of the contact center.

Other features, functionality, and advantages of a management network may exist. This description is for purpose of example and is not intended to be limiting.

As an example procedure, an administrator from the contact center may be tasked to create a new logical directive using the management network. First, the administrator may specify, via a GUI provided by the management network, data that the management network should utilize to determine whether (or when) a logical directive should occur. Then, via the GUI, the administrator may enter specific conditions that the data must adhere to in order for the logical directive to occur. Finally, via the GUI, the administrator may enter specific operations that should take place on the contact center network as an outcome of the logical directive. Accordingly, the management network may automatically create, based on the entered data, all of the corresponding database tables, procedures, classes, relationships, and so on to accomplish the logical directive.

The following embodiments describe architectural and functional aspects of example management networks, as well as the features and advantages thereof. Moreover, the advantages provided by the embodiments herein are not limited to large enterprises and may be applicable to an enterprise, or any other type of organization, of any size.

II. Example Computing Devices and Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory, for example.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support various network architectures. The exact physical location, connectivity, and configuration of these computing devices may be unknown and/or unimportant. Accordingly, in some cases, the computing devices may be referred to as "cloud-based" devices that may be housed at various remote data center locations.

Figure 2:
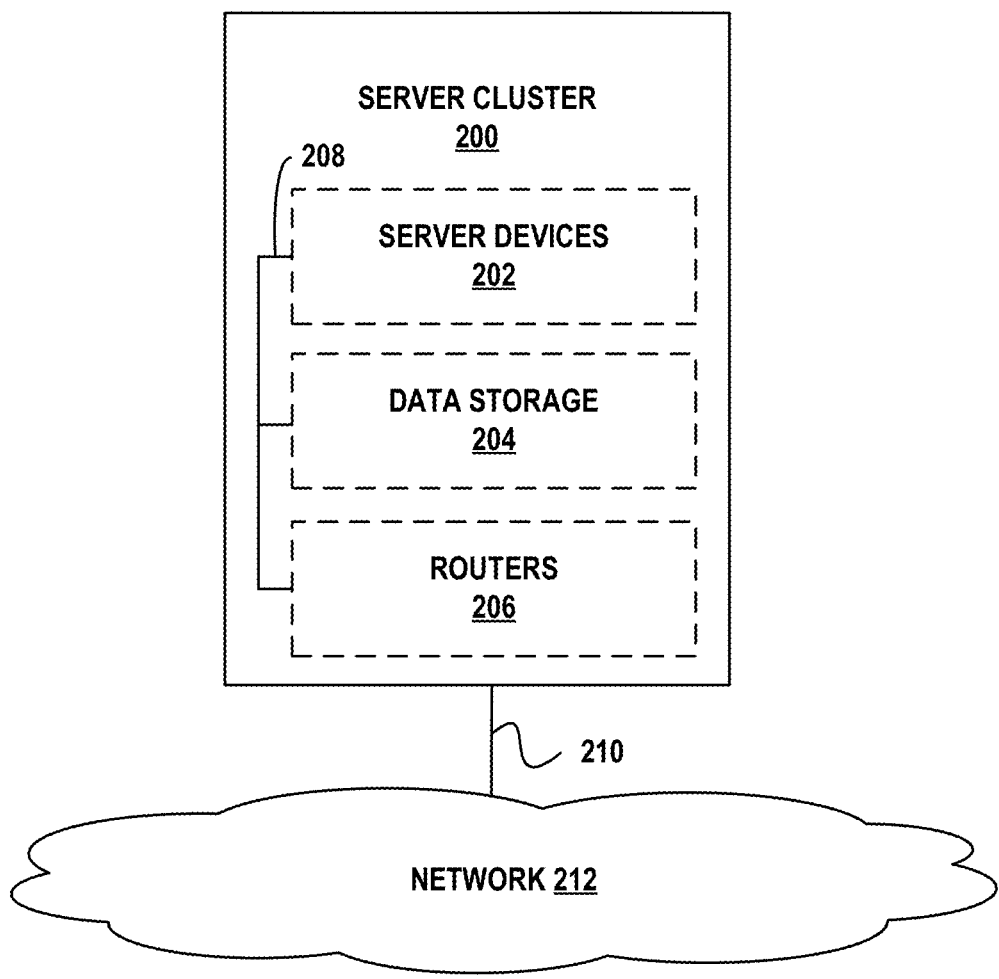
FIG. 2 is a block drawing illustrating a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Network Architectures

Figure 3:
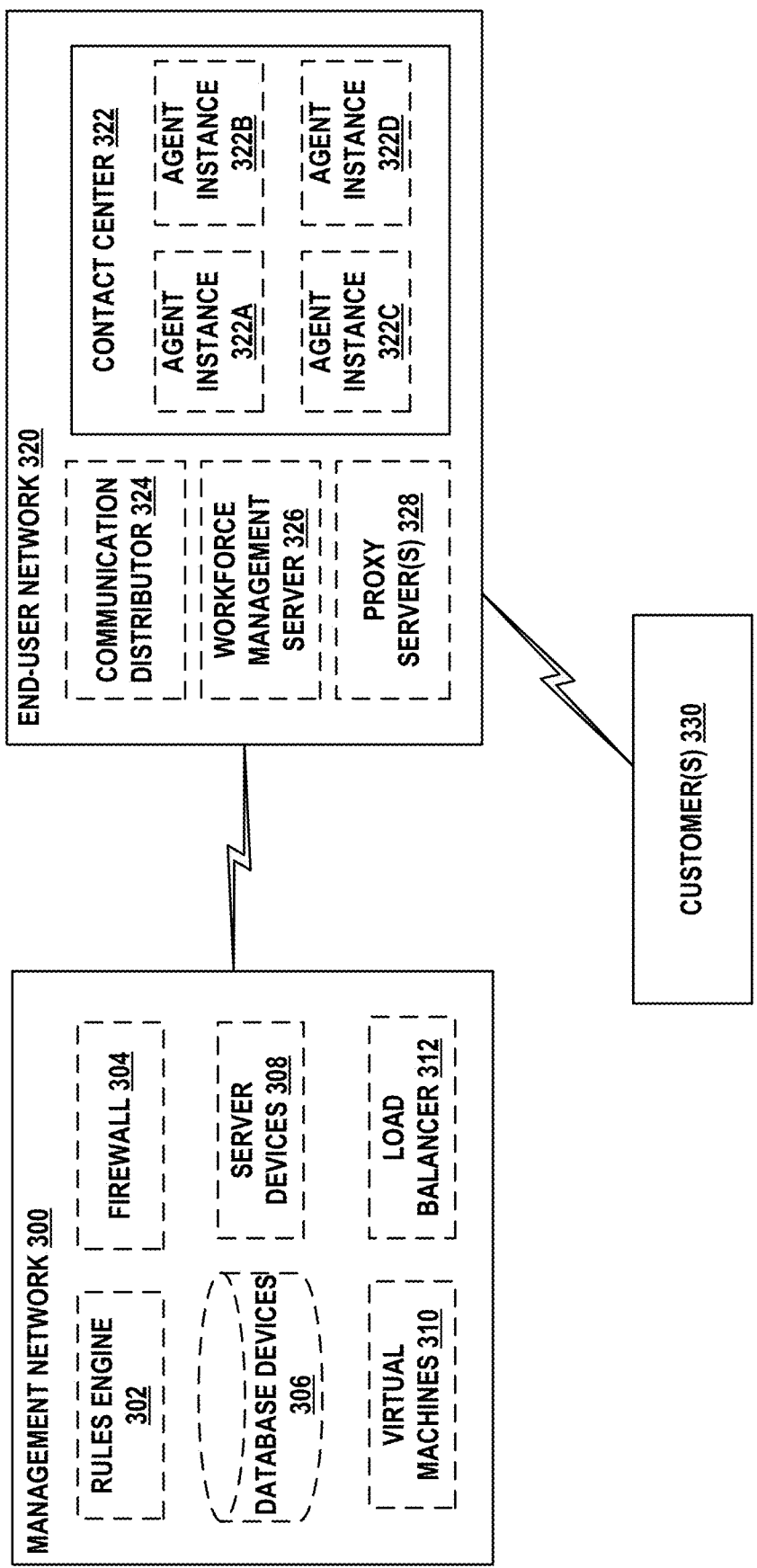
FIG. 3 is a block diagram illustrating a network architecture, in accordance with example embodiments.

FIG. 3 depicts a network architecture, in accordance with example embodiments. This architecture includes three main components, management network 300, end-user network 320, and customer(s) 330.

Management network 300 may be a computing network that provides management services (e.g., contact center management services) to users, particularly to end-user network 320. Such services may be configured by users from end-user network 320. For example, by way of web-based portals, users may specify logical directives, as well as generate reports, view analytics, and perhaps perform other tasks. In order to support various capabilities described herein, management network 300 may include rules engine 302, firewall 304, database devices 306, server devices 308, virtual machines 310, and load balancer 312, each of which may be embodied by computing device 100 and/or server cluster 200.

Rules engine 302 may be a configurable program that, contingent on current operating parameters of end-user network 320, establishes one or more operations that should be performed by management network 300 on behalf of end-user network 320. In particular, rules engine 302 may be configured by users from end-user network 320 to support custom operations. Further details regarding rules engine 302 are discussed below.

Firewall 304 may be one or more specialized routers or server devices that protect management network 300 from unauthorized attempts to access the devices, applications, and services therein, while allowing authorized communication that is initiated from end-user network 320. Firewall 304 may also provide intrusion detection, web filtering, virus scanning, application-layer gateways, and other applications or services. Firewalls, such as firewall 304, typically deny all incoming communication sessions, unless such a session was ultimately initiated from behind the firewall (i.e., from a device on management network 300) or the firewall has been explicitly configured to support the session. In some embodiments (not shown in FIG. 3), management network 300 may include one or more virtual private network (VPN) gateways with which it communicates with end-user network 320.

Database devices 306 may be specialized hardware and/or software used to store data. For example, database devices 306 may include one or more relational databases (e.g., SQL), graph databases (e.g., neo4j), document databases (e.g., MongoDB), column databases (e.g., Cassandra) and/or other database models. In examples, database devices 306 may contain data related to the operations of management network 300 and/or end-user network 320.

Server devices 308 can be used for computational, data storage, communication, and service hosting operations. These servers may be virtualized (i.e., the servers may be virtual machines). In some cases, the server devices 308 may be physically present on management network 300. In other cases, the server devices 308 may be remote server devices hosted by third-party networks (e.g., AMAZON WEB SERVICES® and MICROSOFT® AZURE®).

Virtual machines 310 may be emulations of a computing system, and may mimic the functionality (e.g., processor, memory, and communication resources) of a physical computer. In some embodiments, virtual machines 310 may be managed by a centralized server device or application that facilitates allocation of physical computing resources to individual virtual machines, as well as performance and error reporting. Virtual machines 310 may be employed in order to allocate computing resources in an efficient, as needed fashion. Providers of virtual machines 310 may include VMWARE® and MICROSOFT®. In some embodiments, virtual machines 310 may support operating system level virtualization that allows for multiple isolated userspace instances, or "containers". This type of virtualization may be supported by providers such as DOCKER® and in turn may be managed by a container orchestration software provider, such as KUBERNETES®.

Load balancer 312 may distribute traffic among one or more physical or virtual devices on management network 300. For instance, if management network 300 includes multiple physical or virtual computing devices, load balancer 312 may distribute network traffic and computational tasks across the multiple devices so that no one device is processing more tasks than the others (or more than its specified capabilities allow).

Notably, the configuration of management network 300 is provided as an example. Other configurations and additional devices may exist. For example, management network 300 may contain additional components to those described above (e.g., routers, gateways, etc.). In addition, various client devices, such as personal computers or mobile devices may be connected to management network 300 at any given time. Any component on management network 300 may be replicated across multiple computing devices to provide data duplication and increase capacity of services. Replicated components may be located at various computing locations to ensure high availability in case of power failure at one computing location. In some cases, management network 300 may consist of a few devices and a small number of components. In other cases, management network 300 may span across multiple physical locations and hundreds of devices and components.

End-user network 320 may be, for example, an enterprise network used by an entity for computing and communications tasks, as well as storage of data. In examples, end-user network 320 may provide services to customer(s) 330. These services may be in the form of contact center services for troubleshooting issues that customer(s) 330 may have. In order to support various capabilities as described herein, end-user network 320 may include four main components, contact center 322, communication distributor 324, workforce management server 326, and proxy server(s) 328. In some examples, end-user network 320 may include server devices, routers (e.g., any type of router, switch, or gateway), firewalls, database devices, load balancers, virtual machines, and/or other additional devices as described with respect to management network 300.

Contact center 322 may be a subnetwork of computing devices within end-user network 320. As shown in FIG. 3, contact center 322 includes four agent instances 322A, 322B, 322C, and 322D. Agent instances 322A, 322B, 322C, and 322D may represent one or more computing devices through which web portals, services, and applications can operate. In practice, employees of the entity operating end-user network 320 may utilize agent instances 322A, 322B, 322C, and 322D to provide support to customer(s) 330. In simpler terms, agent instances 322A, 322B, 322C, and 322D may act as a computer device and/or system that provides employees with tools and applications to properly support customer(s) 330. Such tools and applications may be provided by communication distributor 324, workforce management server 326, and/or management network 300.

Communication distributor 324 may be networked hardware and/or software used to facilitate transactions between customer(s) 330 and end-user network 320. In particular, communication distributor 324 may receive incoming communications from customer(s) 330 and may route the communications to channels/queues based on the communication medium/content. In addition, communication distributor 324 may assign agent instances, for example, agent instances 322A, 322B, 322C, and 322D, to provide support to each queue. Communication distributor 324 may include information pertaining to the incoming communications from customer(s) 330 (e.g., how long communications from customer(s) 330 are postponed until being served by an agent instance, whether a communication is abandoned, and so on) and information pertaining to the agent instances assigned to queues (e.g., which agent instances are assigned to which queues). In some examples, communication distributor 324 may have a software component (e.g., a softphone) disposed on agent instances within the contact center 322. As further described below, the management network 300 may utilize information from communication distributor 322 to perform operations on behalf of end-user network 320.

Workforce management server 326 may be networked hardware and/or software used to manage agent instances within contact center 322. During operations, workforce management server 324 may receive information from communication distributor 324 regarding expected communication volumes from customer(s) 330. Using this data, workforce management server 326 may generate schedules for agent instances to cover the expected volume. For example, the workforce management server 326 may generate a schedule for agent instance 322A that stipulates: "work on Monday from 8 AM-5 PM", "work on Wednesday from 4 PM-8 PM", and so on. As further described below, the management network 300 may utilize information from the operations of workforce management server 326 to perform operations on behalf of end-user network 320.

Proxy server(s) 328 may be one or more server devices that facilitate communication and movement of data between end-user network 320 and management network 300. In particular, proxy server(s) 328 may establish and maintain secure communication sessions with one or more computing devices of management network 300, such as rules engine 302, virtual machines 310, and/or virtual private network (VPN) gateways of management network 300 (not shown). By way of such a session, management network 300 may be able to obtain data from and manage aspects of end-user network 320 and its components. In examples, proxy server(s) 328 may be placed behind a firewall of end-user network 320 (e.g., within end-user network 320 and protected by the firewall), such that the firewall might not have to be specifically configured to support incoming sessions from management network 300, thereby avoiding potential security risks to end-user network 320.

Customer(s) 330 may represent entities that communicate with end-user network 320 to resolve issues. For example, customer(s) 330 may represent individuals who communicate with end-user network 320 to receive technical or non-technical assistance. As a more specific example, customer(s) 330 may be purchasers or licensees of a product and may communicate with end-user network 320 to resolve product issues.

To effectively address communications from customer(s) 330, end-user network 320 may perform operations to (i) forward incoming communications from customer(s) 330 to channels/queues, and (ii) assign agent instances from contact center 322 to service channels/queues. As used herein, the operations of forwarding incoming communications to channels/queues may be referred to as "routing," whereas the operations of assigning agent instances to service channels/queues may be referred to as "assignment."

Figure 4:
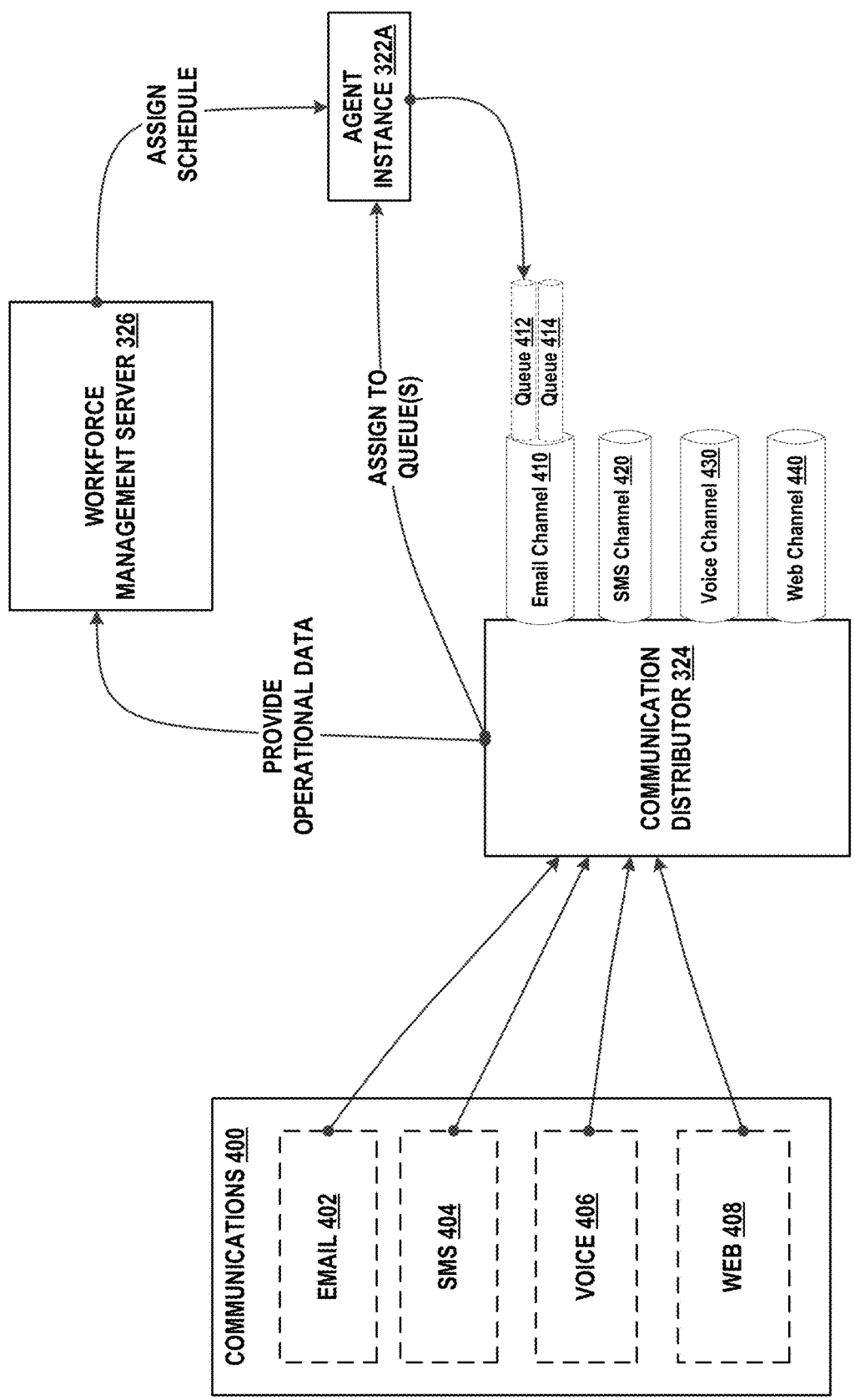
FIG. 4 is a block diagram illustrating routing and assignment, in accordance with example embodiments.

FIG. 4 illustrates a block diagram for routing and assignment, in accordance with example embodiments. In particular, FIG. 4 shows how communication distributor 324 and workforce management server 326 can be used to facilitate routing and assignment of communications from customer(s) 330.

For purpose of the embodiments herein, a "communication" may refer to any form of contact between customer(s) 330 and end-user network 320. For example, a communication may be in the form of a call, a text, an instant message, a web page form, an email, and so on. Example communications 400 are shown in FIG. 4. In particular, communications 400 include email communication 402, which may take the form of an email from customer(s) 330, short message service (SMS) communication 404, which may take the form of a text message from customer(s) 330, voice communication 406, which may take the form of a voice call placed from a telephonic device of customer(s) 330, and web communication 408, which may take the form of a chat message from customer(s) 330. Notably, communications 400 are presented for the purpose of example. In practice, other types of communications may exist.

As communications 400 are being received by communication distributor 324, each incoming communication may be received by a particular communication channel based on the medium of the incoming communication. As used herein, a "communication channel" (or colloquially, just "channel") may refer to an interface within communication distributor 324 that is designed to receive communications over a specific medium. For example, to facilitate email communication 402, communication distributor 324 may include email channel 410 (which may involve a simple mail transfer protocol (SMTP) server configured to receive emails sent to a designated email address). To facilitate SMS communication 404, communication distributor 324 may include SMS channel 420 (which may involve an SMS gateway to configured to receive SMS messages sent over a telecommunications network to a designated phone address). To facilitate voice communication 406, communication distributor 324 may include voice channel 430 (which may involve an automatic call distributor (ACD) service configured to receive calls sent over a telecommunications network to a designated phone address). And to facilitate web communication 408, communication distributor 324 may include web channel 440 (which may involve an Internet relay chat (IRC) server configured to receive chat messages sent over a network). Notably, other types of devices to facilitate communication channels may exist.

As shown in FIG. 4, each channel in communication distributor 324 may include one or more queues. As used herein, a "queue" may refer to a backlog of communications waiting to be serviced by an agent instance. During operations, communication distributor 324 may route communications 400 to queues based on the content of each respective communication, for example.

To clarify the concept of routing, FIG. 4 illustrates queue 412 and queue 414. In an example scenario, if communication distributor 324 is used to resolve mobile device issues, then queue 412 and queue 414 may each represent different mobile device models. For instance, communications regarding Model X issues may be routed to queue 412, whereas communications regarding Model Y issues may be routed to queue 414. Then, communication distributor 324 may assign agent instances to service the communications on queue 412 and queue 414. For example, agent instance 322A is depicted as assigned to queue 412. In examples, communication distributor 324 may assign agent instances to queues based on the skills-sets of agent instances, the volume of calls within a certain queue, and so on.

In examples, several techniques may be used to garner the content of a communication in order to route the communication into an appropriate queue. In some cases, the content of the communication may be provided by customer(s) 330. For instance, during a voice communication, customer(s) 330, via an interface on a telephonic device, may enter an input (such as pressing a key) to indicate the content of the voice communication (also known as an interactive voice response (IVR) system). Or, in the case of an email communication, communication distributor 324 may include different email addresses directed towards different issues. In further examples, communication distributor 324 may contain one or more algorithms to parse incoming communications to deduce content. For instance, text and voice analysis algorithms may be used.

Once within a queue, a communication will remain in abeyance until being served by agent instances assigned to the queue. Alternatively, the communication may drop out of the queue or become abandoned. Because one or more agent instances may serve a given queue, communication distributor 324 may utilize several techniques for distributing calls among agent instances assigned to the given queue. For instance, linear call distribution, circular call distribution, uniform call distribution, simultaneous call distribution, and/or weighted call distribution algorithms may be used. Other techniques may also exist.

In addition to routing and assignment, communication distributor 324 may provide data to workforce management server 326. Such data may include information regarding incoming communications, the amount of communications per channel, the amount of communications per queue, average queue length, and so on. Workforce management server 326 may utilize the received data to inform decisions regarding the scheduling of agent instances. For example, if communication distributor 324 reports to workforce management server 326 that an influx of calls occurs every day around noon, workforce management server 326 may assign schedules for agent instances that are able to satisfy such demand.

Figure 5A:
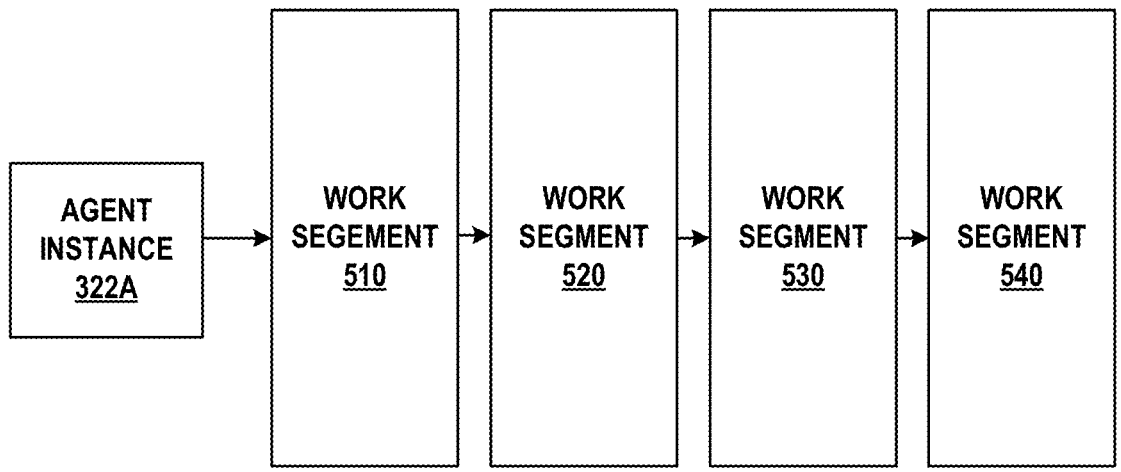
FIG. 5A is a block diagram illustrating a schedule assignment, in accordance with example embodiments.

FIG. 5A illustrates a schedule assignment, in accordance with example embodiments. In particular, FIG. 5A conceptually demonstrates how agent instance 322A may be assigned to different work segments by workforce management server 326. As used herein a "work segment" (or colloquially, just "segment") may refer to a block of time in which an agent instance is assigned to a specific task. For example, work segment 510 may be a segment in which agent instance 322A is assigned to work, work segment 520 may be a segment in which agent instance 322A is also assigned to work, work segment 530 may be a segment in which agent instance 322A is assigned to break, and work segment 540 may be a segment in which agent instance 322A is assigned to work. Work segments 510-540 are presented for the purpose of example. In practice, many different work segments or orders of work segments may be assigned to agent instance 322A to satisfy the needs of end-user network 320. Notably, within a given work segment, an agent instance may perform various functions, each of which may be captured by a respective "operative state".

Figure 5B:
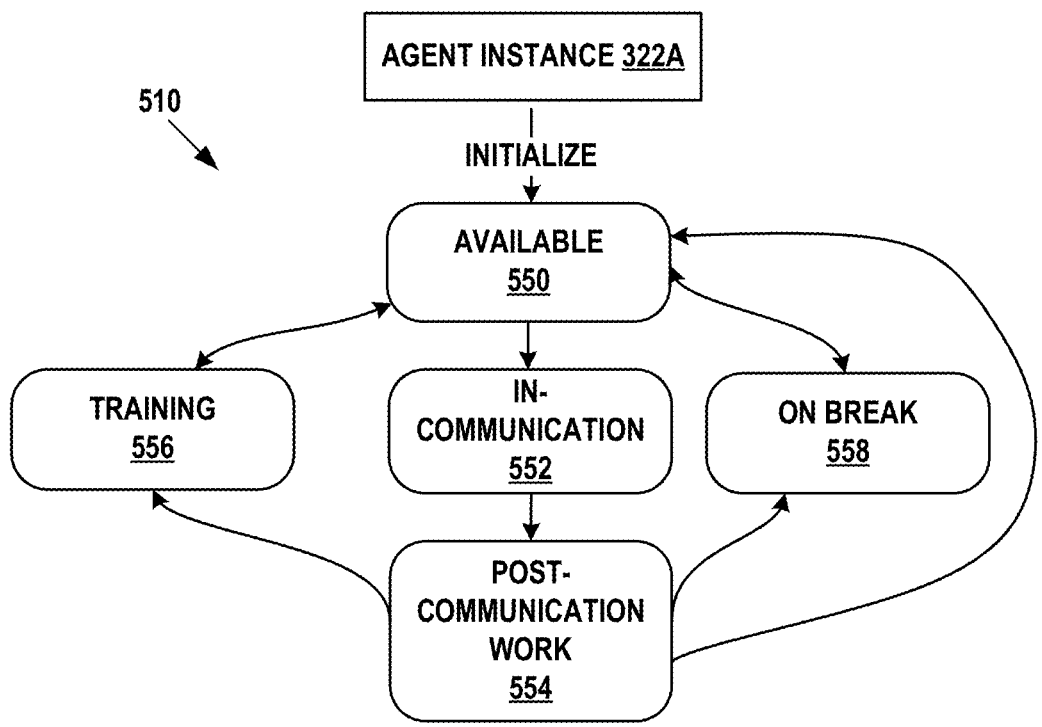
FIG. 5B is a block diagram illustrating operative states within a work segment, in accordance with example embodiments.

FIG. 5B illustrates operative states within work segment 510, in accordance with example embodiments. In particular, FIG. 5B conceptually demonstrates how agent instance 322A may move between various operative states during the course of an assigned work segment. As used herein, operative state (or colloquially, just "state") may refer to a current function being performed by an agent instance. Some operative states may be visited zero times or more than one time. Also, operative states may have more than one possible next state, thus representing a decision to be made by communication distributor 324, for example.

When beginning a work segment, agent instance 322A may initialize into available state 550. Available state 550 may represent a state in which agent instance 322A is capable of taking on any function. From available state 550, agent instance 322A may transition to training state 556, in-communication state 552, or on-break state 558. In particular, training state 556 may represent a state in which agent instance 322A is performing a training module, in-communication state 552 may represent a state in which agent instance 322A is performing a communication with customer(s) 330, and on-break state 558 may represent a state in which the agent instance 322A is in a period of respite. In examples, communication distributor 324 may assign agent instance 322A to any of states 552, 556, or 558 based on current needs and communication demands.

FIG. 5B also depicts post-communication work state 554. This state may represent a state in which agent instance 322A is performing survey and/or evaluation work in regards to a recent communication. Transitions to post-communication work state 554 may occur from in-communication state 552. From post-communication work state 554, communication distributor 324 may assign agent instance 322A to any of states 550, 556, or 558 based on current needs and communication demands.

It should be noted that the descriptions of FIGS. 5A and 5B are used for the purpose of example and are not intended to be limiting with respect to the embodiments herein. In practice, many different work segments or operative states may exist.

IV. Example Rules Engines

In line with the discussion above, while communication distributor 324 and workforce management server 326 may provide some benefits to end-user network 320, such components may fail to provide end-user network 320 with the capability to logically transition operations to address unpredictable events. For example, if agent instances become idle due to low incoming communication volume, an advantageous operation may be to send the agents on break or provide agents with training modules to occupy the downtime.

To address this and other issues, management network 300 may be used to intelligently perform operations on behalf of end-user network 320. Management network 300 may access data, applications, and services within the end-user network 320 by way of proxy server(s) 328. Moreover, management network 300 may support the ability to configure the operations using logical directives. This allows management network 300 to be rapidly adapted by the end-user network 320 to meet specific needs.

Figure 6:
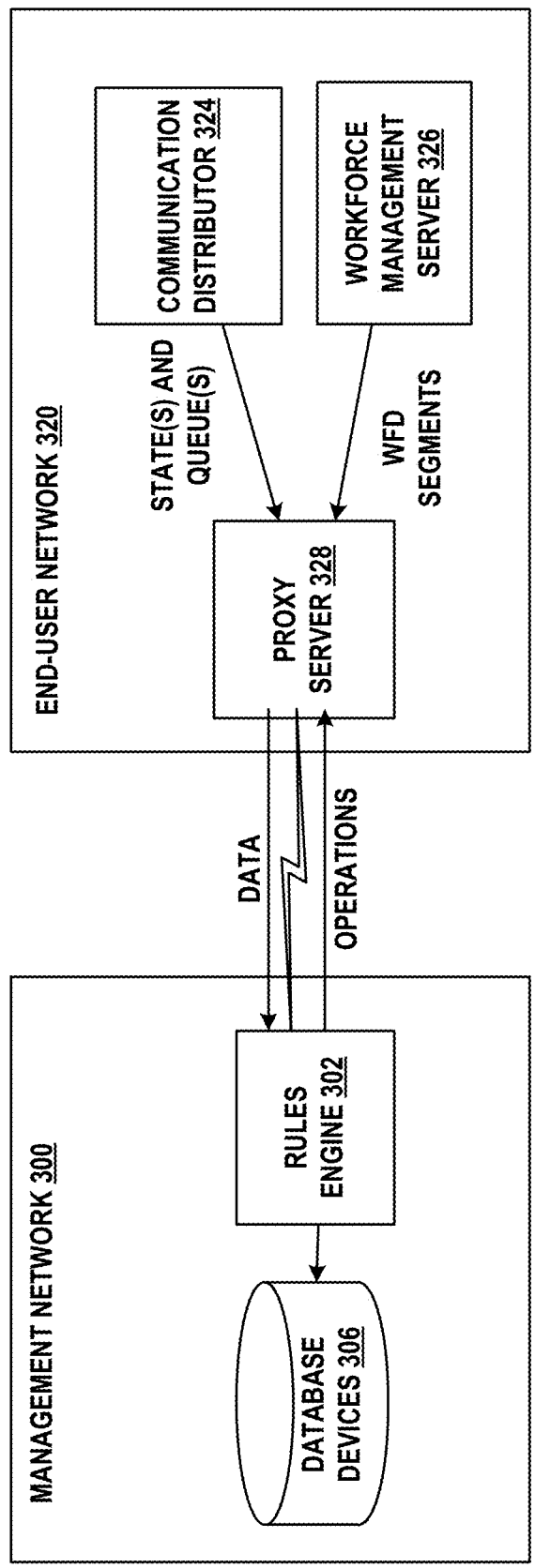
FIG. 6 is a block diagram illustrating a communication environment between a management network and an end-user network, in accordance with example embodiments.

FIG. 6 illustrates a communication environment between management network 300 and end-user network 320, in accordance with example embodiments. In FIG. 6, rules engine 302 may be communicatively coupled with proxy server(s) 328

As described, proxy server(s) 328 may be one or more server devices installed by the management network 300 onto end-user network 320. Proxy server(s) 328 may be configured to request and consolidate data from communication distributor 324, workforce management server 326, and/or other devices on end-user network 320. From communication distributor 324, proxy server(s) 328 may request data associated with operative states, channels, and queues. For example, such data may include queue statistics (e.g., average wait times for queues), events (e.g., an agent instance transitioning from an "in communication" agent state to a "post-communication work" agent state), and perhaps other metrics. From workforce management server 326, proxy server(s) 328 may request data associated with work segments. For example, such data may include staffing groups (e.g., groups of agent instances assigned to work similar work segments), work segment start times/end times, and perhaps other metrics. Once received, proxy server(s) 328 may transmit the data to management network 300 for processing.

Data transmitted by proxy server(s) 328 may be received by rules engine 302. As described, rules engine 302 may be a computational entity on management network 300 that, depending on the data received from proxy server(s) 328, performs operations on behalf of end-user network 320. Example operations may include changing the state of an agent instance (via commands not shown in FIG. 6) to the communication distributor 324), changing the work segment of an agent instance (via commands not shown in FIG. 6) to workforce management server 326), or sending notifications (e.g., in the form of emails or SMS messages) directly to an agent instance. In some cases, data received from proxy server(s) 328 may be persisted into database devices 306 on the management network 300 for later reporting. In some examples, management network 300 may utilize buffers (e.g., message queues) to ensure guaranteed delivery of incoming data and outgoing operations.

Operations performed by rules engine 302 are the result of rules. Rules can be designed by users from end-user network 320 through the use of a software-based design tool. Such a tool presents the rule designer with options for defining triggers, conditions, actions, and other characteristics of the rule. The tool may utilize a GUI, and may be embodied as a series of one or more web pages and/or web-based applications deployed upon the management network 300 and provided to authorized users from end-user network 320 upon request. Entering information into the one or more web pages and/or web-based applications may be referred to as defining a "specification". Once completed, rules may be added to rules engine 302 to automatically carry out various operations on end-user network 320 in an organized and efficient manner. Notably, the rule design tool may be referred to as a "low-code/no-code" solution, because designers write very little code, perhaps no code at all, for the rule. As used herein, rules may also be referred to as "logical directives".

Rules may be designed based around specific definitions of triggers, conditions, and actions. Triggers may be used to specify circumstances that start a rule, such as an event occurring on end-user network 320 (e.g., an agent instance ending a communication) or according to a schedule (e.g., once per day or once per week). Conditions may be evaluated when the rule is triggered. If the conditions are met, then the rule's actions may be executed. Actions (or sometimes referred to herein as "operations") may include controlled logic that specifies operations that should occur if the triggers and conditions are met. Actions may involve operations that change the operative state of an agent instance, send a notification to an agent instance, and so on. Notably, while rules herein are discussed with regard to triggers, conditions, and actions, the embodiments herein allow for support for other types of rule design.

FIGS. 7A, 7B, 7C, 7D, 7E, and 7F are associated with scenario 700 for a rule design tool. In scenario 700, a rule designer may be presented with a series of GUI panes that allow the designer to define a rule. As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes.

In particular, scenario 700 may be associated with a situation in which end-user network 320 does not have a sufficient amount of agent instances to service incoming communications. Accordingly, it may be advantageous to (i) identify high performing agent instances (e.g., based on length of call durations), and (ii) offer extra work segments to the identified agent instances in order to satisfy communication requests. As such, the goals of the rule may be to: (i) look up and identify agent instances with short call durations, and (ii) request that the identified agent instances add extra work segments to their current schedule.

Notably, scenario 700 and the panes of FIGS. 7A-7F are examples used merely for purposes of illustration and not intended to be limiting. In practice, the rule design tool may be able to provide other panes including alternative arrangements of information usable for designing rules. In alternative embodiments, different types of information may be displayed, and there may be more or fewer buttons potentially with different functionality.

Figure 7A:
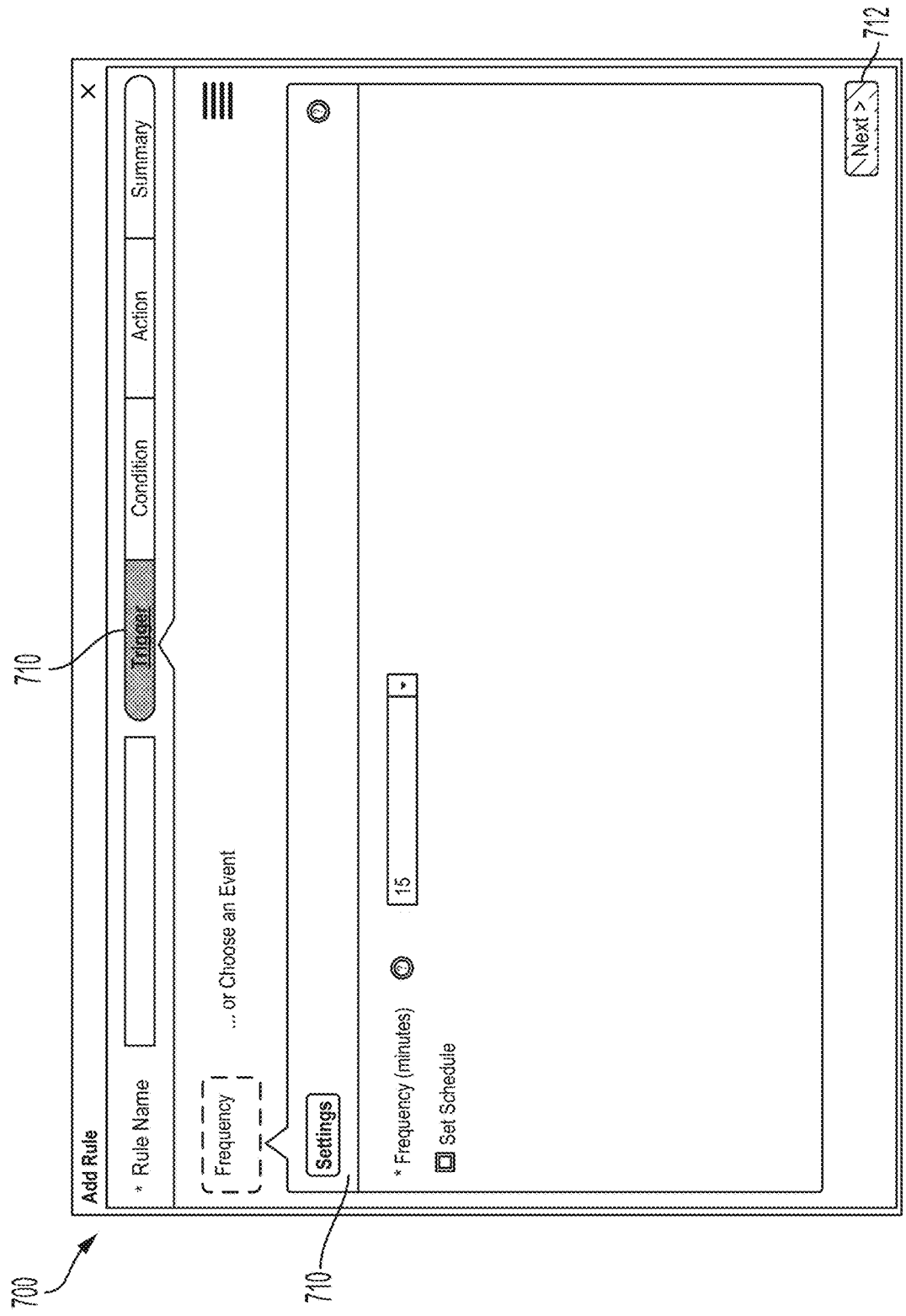
FIG. 7A is a screen shot diagram illustrating a trigger specification pane of a rule design tool, in accordance with example embodiments.

Scenario 700 may begin at FIG. 7A, which depicts a trigger specification pane 710 of a rule design tool, in accordance with example embodiments. In alternative embodiments, different types of information about the trigger may be displayed, and there may be more or fewer buttons potentially with different functionality. Moreover, the word "Trigger" is shown bolded, underlined, and in a dark color background to indicate that a trigger is being specified, while the words "Condition", "Action" and "Summary" are shown in a lighter color background to indicate that these specifications are not taking place.

As noted previously, at least two types of triggers may be supported by the rule design tool. Frequency-based triggers may cause a rule to be executed at one or more specified times. For example, a frequency-based trigger may be scheduled to execute every X minutes, hourly, daily, weekly, monthly, just once (at a specified time), or to repeat at a user-specified interval. Event-based triggers may cause a rule to be evaluated when an event occurs on management network 300 or end-user network 320. For example, event-based triggers may be based on events occurring on communication distributor 324 (e.g., the changing of an operative state of an agent instance), events occurring on the management network 300, (e.g., a training module transmitted to an agent instance, etc.), and perhaps other types of events. In examples, some or all of the possible event-based triggers may be provided based on the data received by rules engine 302 from proxy server(s) 328. In some embodiments, multiple triggers can be specified and can be joined together using AND/OR logical statements.

In trigger specification pane 710, the dashed line around "Frequency" indicates that the user has selected a frequency-based trigger and set the frequency to 15 minutes. Once the user is satisfied with the information entered in trigger specification pane 710, scenario 700 may continue to FIG. 7B with the user selecting or otherwise activating the "Next" button 712.

Figure 7B:
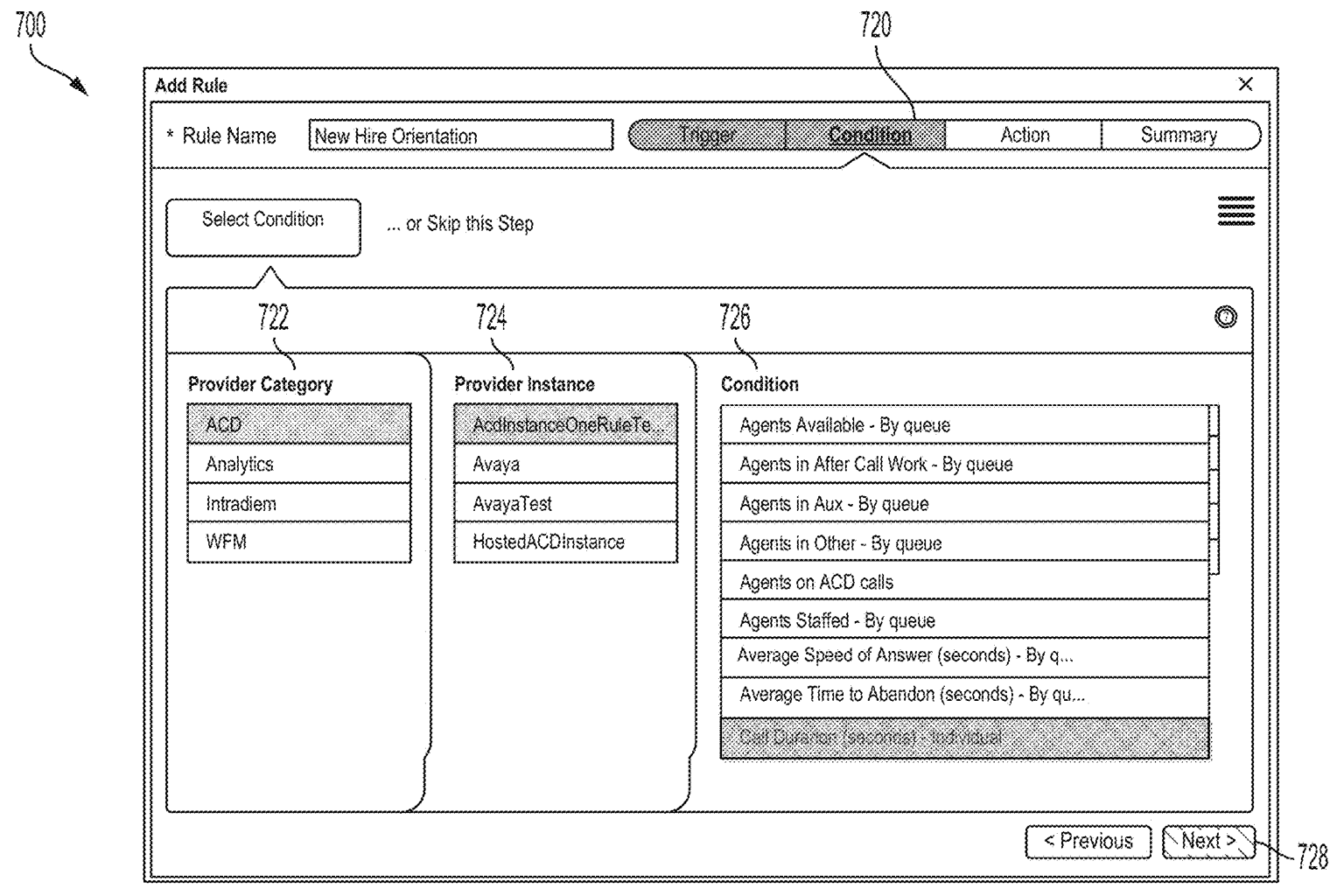

FIG. 7B depicts condition specification pane 720 of a rule design tool, in accordance with example embodiments. In particular, condition specification pane 720 may allow the user to specify a condition, which may include (i) an operational metric and (ii) a logical comparison for the operational metric that, if evaluated to true, cause the rule's action(s) to be performed. In some embodiments, multiple conditions can be specified and can be joined together using AND/OR logical statements. Conditions may be optional and, if not specified, may cause an action to be performed upon a trigger being initiated. In alternative embodiments, different types of information about the conditions may be displayed, and there may be more or fewer buttons potentially with different functionality. Moreover, the word "Condition" is shown bolded, underlined, and in a dark color background to indicate that a condition is being specified, while the words "Action" and "Summary" are shown in a lighter color background to indicate that these specifications have yet to take place. Further, the word "Trigger" is shown in dark color background to show that trigger(s) have already been specified by the user.

As shown in condition specification pane 720, the user may utilize category menu 722, provider instance menu 724, and condition menu 726 to specify an operational metric.

Provider category menu 722 displays several categories, some or all of which may be automatically populated based on entities from which proxy server(s) 328 receives data. Categories may be used to classify types of operational metrics. For example, the "ACD" category may include metrics from communication distributor 324 operations. The "Intradiem" category may include metrics from management network 300 operations. The "WFM" category may include metrics from workforce management server 326 operations. And the "Analytics" category may include metrics based on analysis of network traffic on end-user network 320, desktop analytics on agent instances 322A-322D, and so on. Other categories may also exist. In FIG. 7B, provider category menu 722 indicates, with a darker background, that the user has selected the "ACD" category. This may cause provider instance menu 724 to be displayed.

Provider instance menu 724 contains a number of options, some or all of which may be populated based on the user's selection from provider category menu 722. Because communicator distributor 324 may utilize several computational instances during operations (e.g., communicator distributor 324 may take the form of three distinct server devices), provider instance menu 724 may be populated to reflect each computational instance of communicator distributor 324. Accordingly, the selection from provider instance menu 724 may specify a particular computational instance for which the operational metric should be evaluated. In FIG. 7B, provider instance menu 724 indicates, with a darker background, that the user has selected the "AcdInstanceOneRule" instance from the "ACD" provider category. This may cause condition menu 726 to be displayed.

Condition menu 726 contains a number of options, some of which may be populated based on the user's selections from provider category menu 722 and provider instance menu 724. Particularly, condition menu 726 may be populated to reflect specific operational metrics. For example, as shown in FIG. 7B, the user is presented with various operational metrics relating to the operations of communication distributor 324. These include operational metrics related to operative state, such as "Agents in After Call work", operational metrics related to queues, such as "Agents Staffed-By Queue", and operational metrics related to communication lengths, such as "Call Duration". Notably, had the user selected "WFM" from provider category menu 722, then operational metrics related to workforce management server 326 may be displayed in condition menu 726, such as "Shift Start Time" and "Shift End Time". And had the user selected "Intradiem" from provider category menu 722, then operational metrics related to management network 300 may be displayed in condition menu 726, such as "Number of Agents Logged In" and "Percent of Agents Logged In". In FIG. 7B, provider instance menu 726 indicates, with a darker background, that the user selected the "Call Duration" metric.

Figure 7C:
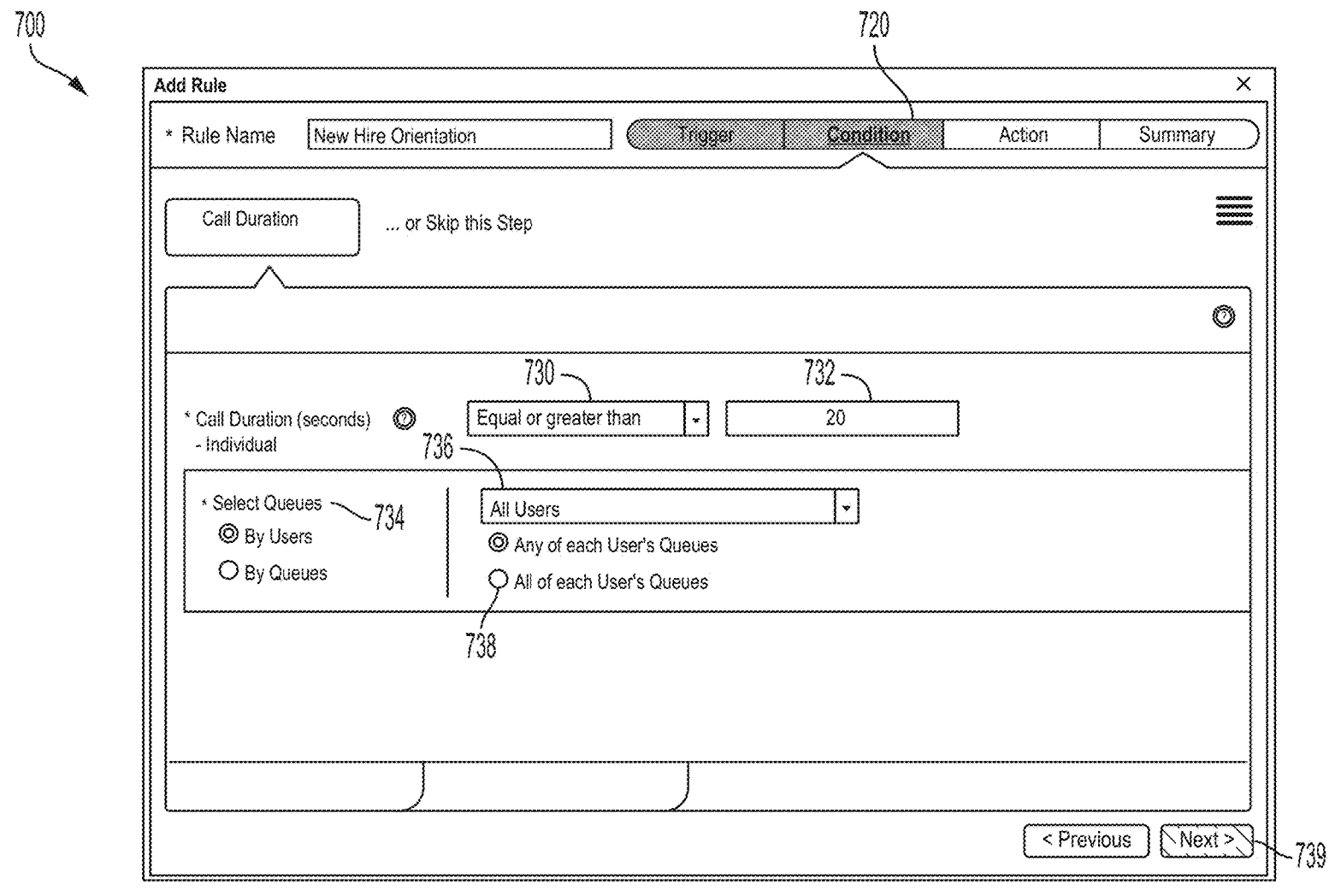

Once the user is satisfied with the information entered in condition specification pane 720, scenario 700 may continue to FIG. 7C with the user selecting or otherwise activating the "Next" button 728.

FIG. 7C depicts a second portion of a condition specification pane 720 of a rule design tool, in accordance with example embodiments. The pane depicted in FIG. 7C assumes that the selection shown in FIG. 7B has been finalized. Thus, FIG. 7C depicts an additional window that may allow a user to further specify details for the operational metric specified in FIG. 7B.

FIG. 7C contains a number of drop-down menus and radial buttons, some or all of which may be populated based on the user's selections from FIG. 7B. Particularly, FIG. 7C includes operator menu 730, operator input 732, selection buttons 734, selection dropdown 736, and logic selection 738.

Operator menu 730 may include options for inequalities (and equalities) that compare operational metrics to the value of operator input 732. In examples, operator menu 730 may include options for "Equal or greater than", "Equal To", "Greater Than", "Greater than or equal to", "Less than", and "Less than or equal to". In FIG. 7C, operator menu 730 indicates that the user selected the "Equal or greater than" inequality.

Operator input 732 may be an input field that allows users to enter a value for which operational metrics will be compared against. In FIG. 7C, operator input 732 indicates that the user entered the value of "20".

Together, the selection from operator menu 730 and the input of operator input 732 form a logical comparison. This logical comparison may be evaluated against the operational metric specified in FIG. 7B. If the operational metric selected in FIG. 7B satisfies (i.e., evaluates to true) the logical comparison, then the rule's action(s) may be performed.

As an example, FIG. 7C indicates that the user selected "Call Duration" as the operational metric. Thus, call duration may be compared to the operator input 732 using the inequality specified by operator menu 730. In particular, if the call duration is equal to or greater than 20 seconds, then the condition will evaluation to true. And if the call duration is less than 20 seconds, the condition will not evaluate to true. Other possible entries for operator menu 730 and operator input 732 may exist.

Selection menu 734 and selection dropdown 736 may be used to filter operational metric calculations. Particularly, selection dropdown 736 may contain a number of options, some or all of which may be populated based on the user's selection from selection menu 734.

In FIG. 7C, selection menu 734 indicates the user has selected the "By Users" option. This selection may cause selection dropdown 736 to display a plurality of user groups (e.g., subsets of agent instances). In examples, user groups may be defined based on geographic regions of the agent instances (e.g., Southeast Regional Group), skill sets of agent instances (e.g., Mobile Devices Group), and so on. Selecting a particular user group from selection dropdown 736 may filter an operational metric to be calculated with respect to agent instances within the particular user group. In FIG. 7C, selection dropdown 736 indicates that the user has selected the "All Users" user group. Notably, had the user selected the "By Queues" option on selection menu 734, selection dropdown 736 may have displayed queue groups and the operational metric filter could have been based on queue groups. Other types of filters may also exist.

Logic selection 738 may be used to define the way in which logical comparisons should be evaluated with respect to particular criteria. Prospective criteria may be demarcated by selection menu 734 and may include queues, user groups, and so on. In the example shown, logic selection 738 contains two options: "Any Of" and "All Of".

In examples, the "Any of" option may be used to specify a logical disjunction (e.g., a logical OR). More specifically, selecting the "Any of" option may cause a rule's action(s) to be performed if any of the criteria satisfy the logical comparison. For instance, as shown in FIG. 7C, the "Any of" option indicates that, for a given user from the "All Users" user group, if any of the given user's queues satisfy the logical comparison defined in FIG. 7B, then the rule's action should be performed for that given user.

In examples, the "All of" option may be used to specify a logical conjunction (e.g., a logical AND). More specifically, selecting the "All of" option may cause a rule's action to be performed if and only if all of the criteria satisfy the logical comparison. For instance, as shown in FIG. 7C, the "All of" option indicates that, for a given user from the "All Users" user group, if all of the given user's queues satisfy the logical comparison defined in FIG. 7B, then the rule's action should be performed for that given user.

Figure 7D:
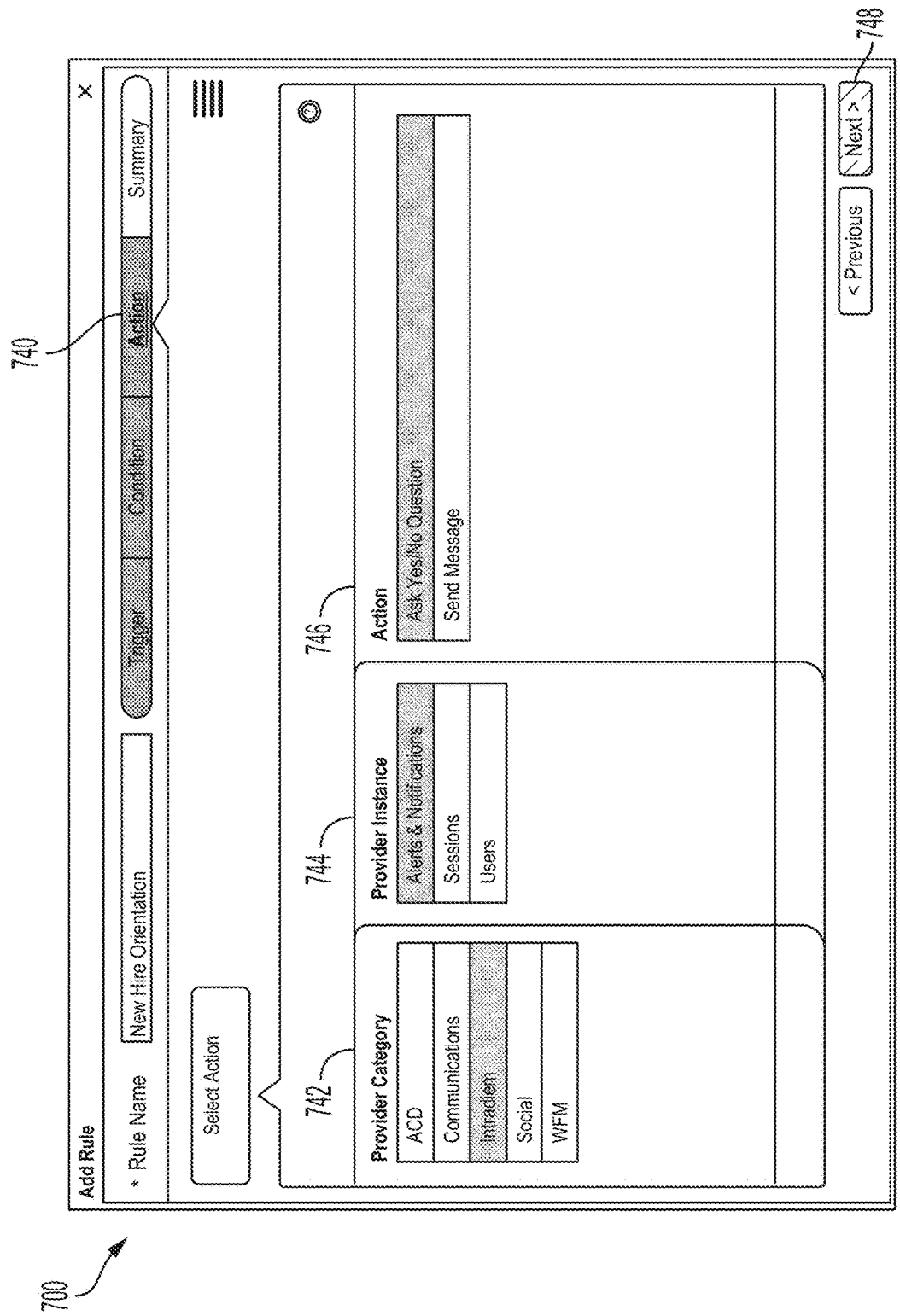
FIG. 7D is a screen shot diagram illustrating an action specification pane of a rule design tool, in accordance with example embodiments.

Once the user is satisfied with the information entered in FIG. 7C, scenario 700 may continue FIG. 7D with the user selecting or otherwise activating the "Next" button 739.

FIG. 7D depicts an action specification pane 740 of a rule design tool, in accordance with example embodiments. As noted previously, actions may allow the user to specify operations that management network 300 may be perform on behalf of end-user network 320. In alternative embodiments, different types of information about the actions may be displayed, and there may be more or fewer buttons potentially with different functionality. In some embodiments, multiple actions can be specified. These multiple actions can be sequenced and can be joined together using AND/OR logical statements. Moreover, the word "Action" is shown bolded, underlined, and in a dark color background to indicate that an action is being specified, while the word "Summary" is shown in a lighter color background to indicate that this specification has yet to take place. Further, the words "Trigger" and "Condition" are shown in a darker color background to show that trigger(s) and condition(s) have already been specified by the user.

Similar to condition specification pane 720, the user may specify actions by way of provider category menu 742, provider instance menu 744, and action menu 746.

Provider category menu 742 displays several categories, some or all of which may be populated based on the entities from which proxy server(s) 328 receives data. Categories may be used to classify types of operations. For example, the "ACD" category may include operations that may be performed on communication distributor 324. The "Intradiem" category may include operations that may be performed on management network 300. The "WFM" category may include operations that may be performed on workforce management server 326. The "Communications" category may include operations that may be performed via email, SMS, or telephone. And the "Social" category may include operations that may be performed on a social media platform operated by end-user network 320, such as TWITTER® or FACEBOOK®. Other categories may also exist. In FIG. 7D, provider category menu 742 indicates, with a darker background, that the user has selected the "Intradiem" category. This may cause provider instance menu 744 to be displayed.

Provider instance menu 744 contains a number of options, some or all of which may be populated based on the user's selection from provider category menu 742. In particular, the selection of an instance from provider instance menu 744 may be used to specify a computational instance upon which operations will be performed. In FIG. 7D, provider instance menu 744 indicates, with a darker color background, that the user has selected the "Alerts & Notifications" instance from the "Intradiem" provider category. This may cause action menu 746 to be displayed.

Figure 7E:
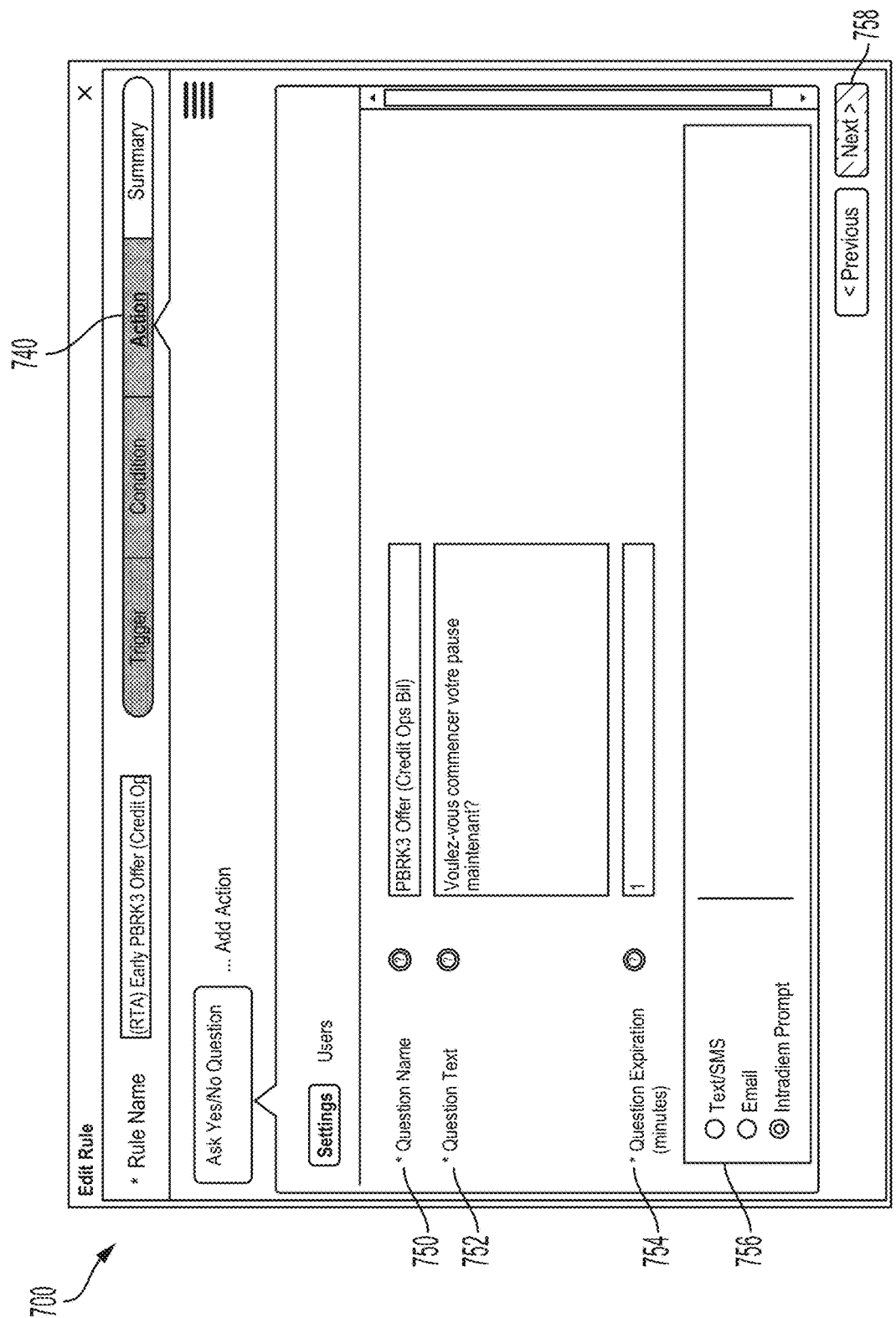
FIG. 7E is a screen shot diagram illustrating a second portion of an action specification pane of a rule design tool, in accordance with example embodiments.

Action menu 746 contains a number of options, some of which may be populated based on the user's selections from provider category menu 742 and provider instance menu 744. Particularly, action menu 746 may be populated to reflect the types of operations that may be performed on the instance selected from provider instance menu 744. For example, as shown in FIG. 7D, the user is presented with operations that include questions, such as "Ask Yes/No Question", or messages, such as "Send Message". Notably, had the user selected "ACD" from provider category menu 742, then operations relating to communication distributor 324, such as changing operative state or modifying an agent instance's queues, may be displayed in condition menu 746. And had the user selected "WFM" from provider category menu 742, then operations relating to workforce management server 326, such as modifying work segments, may be displayed in condition menu 746. In FIG. 7E, action menu 746 indicates, with a darker color background, that the user has selected the "Ask Yes/No question" operation.

Once the user is satisfied with the information entered in FIG. 7D, scenario 700 may continue to FIG. 7E with the user selecting or otherwise activating the "Next" button 748.

FIG. 7E depicts a second portion of action specification pane 740 of a rule design tool, in accordance with example embodiments. The pane depicted in FIG. 7E assumes that the selection shown in FIG. 7D has been finalized. Thus, FIG. 7E depicts an additional window that may allow a user to further specify details for the action specified in FIG. 7D. In alternative embodiments, different types of information about the action may be displayed, and there may be more or fewer buttons potentially with different functionality.

Continuing in scenario 700, FIG. 7E contains a number of textual input regions that may allow users to specify the yes/no question that is asked. In particular, text region 750 may allow users to input the question name and text region 752 may allow users to input the question text. Text region 754 may allow users to input the duration of the question (i.e., how long the prompt of the question will be accessible to the user to answer). Radial buttons 756 may allow users to specify the delivery medium of the yes/no question.

Figure 7F:
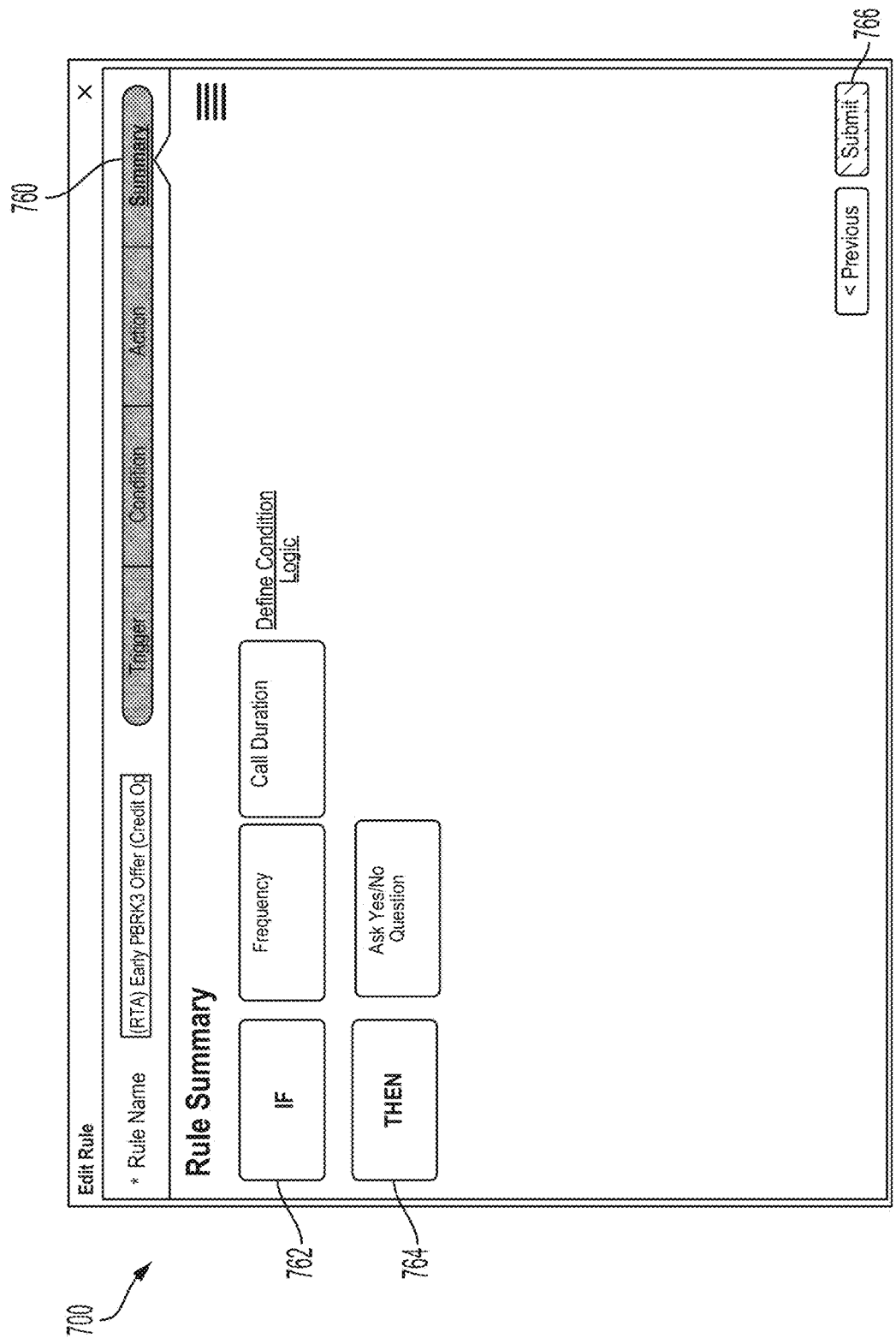
FIG. 7F is a screen shot diagram illustrating a Rule Summary, in accordance with example embodiments.

Once the user is satisfied with the information entered in FIG. 7E, scenario 700 may continue to FIG. 7F with the user selecting or otherwise activating the "Next" button 758.

FIG. 7F depicts summary pane 760 of a rule design tool, in accordance with example embodiments. The word "Summary" is shown bolded, underlined, and in a dark color to indicate that a summary is being shown, while the words "Trigger", "Condition" and "Action" are also shown in a dark background indicate that these specifications have already taken place. In alternative embodiments, different types of information may be displayed, and there may be more or fewer buttons potentially with different functionality.

In particular, summary pane 760 depicts a summary of the triggers, conditions, and actions defined in FIGS. 7A-7E. For example, at 762, the triggers and conditions specified in FIGS. 7A, 7B, and 7C are displayed in summary form. At 764, the actions specified in FIGS. 7D and 7E are displayed in summary form. Once the user is satisfied with the summary information depicted in summary pane 760, scenario 700 may conclude with the user selecting or otherwise activating the "Submit" button 766. Upon doing so, the triggers, conditions, and actions defined in scenario 700 may be made available to management network 300 (by way of rules engine 302) to evaluate data from and perform operations on behalf of end-user network 320.

By using the rule design tool described, arbitrarily complex rules can be rapidly designed. The designer need not write any code, and is guided through the rule design by a series of GUIs that help the designer with appropriate menus and other interface elements. As a result, the rule design tool saves a significant amount of time.

Figure 8A:
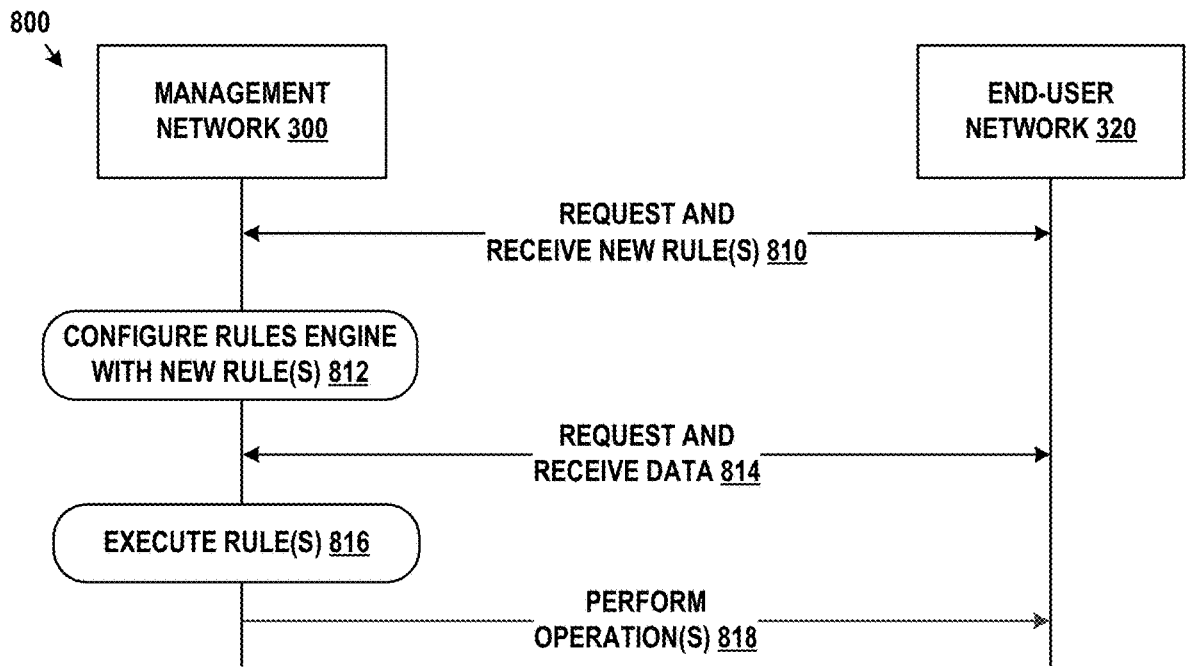
FIG. 8A is a message flow diagram illustrating a procedure, in accordance with example embodiments.

FIG. 8A depicts a message flow diagram for procedure 800, in accordance with example embodiments. In particular, procedure 800 may represent a specific sequence or series of actions that, when performed, allows management network 300 to perform operations on behalf of end-user network 320. By way of example, procedure 800 may utilize management network 300 and end-user network 320 during operation. However, additional components, steps, or blocks, may be added to procedure 800.

At step 810, management network 300 may request and receive new rule(s) from end-user network 320. To facilitate step 810, management network 300 may prompt a user from end-user network 320 to enter the appropriate data into a rule design tool. This may be accomplished by way of a web page or series of web pages hosted by management network 300 and provided to the user upon request. Entering data for a rule may include, for example, populating entries in trigger specification pane 710, condition specification pane 720, and action specification pane 740. At step 812, management network 300 may receive the populated entries and can configure rules engine 302 to implement the new rules.

At step 814, management network 300 may request and receive data from end-user network 320. This step may include, for example, rules engine 302 requesting and receiving data from proxy server(s) 328, as discussed above with respect to FIG. 6. The data received by management network 300 may include operational data related to communicator distributor 324, workforce management server 326, and/or other entities on end-user network 320.

At step 816, the data received from end-user network 320 may be evaluated against the rules defined by step 812. This may include, for example, (i) identifying whether a trigger has been fired, (ii) identifying whether conditions evaluate to true, or (iii) identifying operations that should be performed on behalf of end-user network 320. At step 818, management network 300 may perform operations on behalf of end-user network 320. This may include, for example, changing the operative state of an agent instance, modifying the work segments of an agent instance, and/or other operations. In some cases, the operations may be performed by issuing commands (e.g., application programming interface (API) requests) to entities on end-user network 320. In some cases, the operations may be performed by issuing commands to entities on management network 300.

Figure 8B:
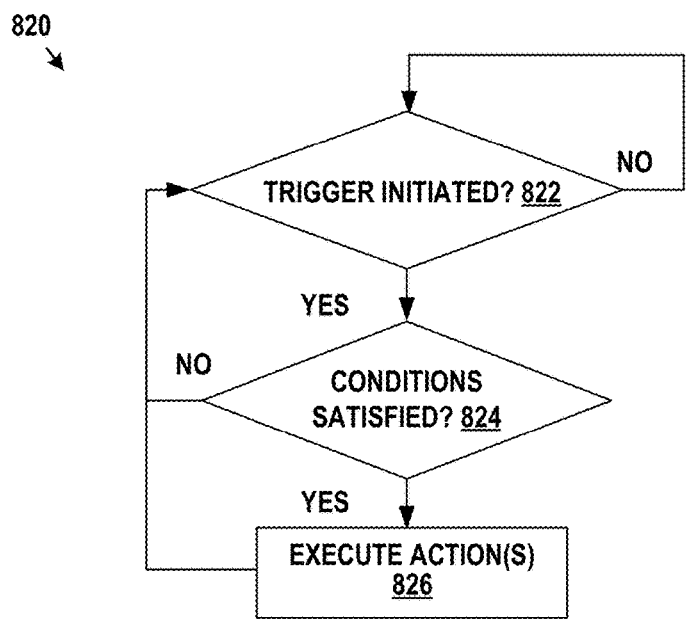
FIG. 8B is a flow diagram for a procedure, in accordance with example embodiments.

FIG. 8B depicts a flow diagram for procedure 820, in accordance with example embodiments. In particular, procedure 820 may represent a specific sequence or series of actions that, when performed, allows management network 300 to evaluate whether an operation should be performed on behalf of end-user network 320. By way of example, procedure 820 may occur on rules engine 302; however, in alternative examples, procedure 820 may be performed on other computational entities on management network 300. Moreover, additional components, steps, or blocks, may be added to procedure 820 without departing from the scope of the method.

Procedure 820 may begin at block 822, when rules engine 302 determines whether a trigger is initiated. As described with respect to trigger specification pane 710, triggers may be either event-based triggers (i.e., based on events occurring on management network 300 and/or end-user network 320) or frequency-based triggers (i.e., based on a period of time). It follows that block 822 may be considered a "default state" of rules engine 302, since each block in procedure 820 may return to block 822. If a trigger is initiated, procedure 820 can continue to block 824. Otherwise, procedure 820 will remain at block 822

At block 824, rules engine 302 may determine whether the conditions for a given rule are satisfied. As described with respect to condition specification pane 720, conditions may be satisfied if the operational metrics specified by the user satisfy (i.e., evaluate to true) the logical comparisons specified by the user. If all the conditions are satisfied, procedure 820 can continue to block 826. Otherwise, procedure 820 will return back to block 822.

At block 826, rules engine 302 may execute actions for a given rule. As described with respect to action specification pane 740, actions may include operations performed on management network 300, end-user network 320, and/or other computational entities associated with management network 300 or end-user network 320 (e.g., third-party networks used by end-user network 320). After the actions are executed, procedure 820 may return to block 822 to wait for another trigger to be initiated.

Notably, the procedure of 820 may be referred to as a "real-time" solution, because the procedure may continuously monitor and respond to existing events occurring on management network 300 and/or end-user network 320. Advantageously, rather than using reactive techniques, such as data mining, to identify the exact operations that should occur on end-user network 320, the procedure of 820 provides a preemptive approach that allow anticipatory operations to occur on end-user network 320.

V. Example Monitoring Applications

As detailed above, management network 300 may use data from communication distributor 324/workforce management server 326 to perform operations on behalf of end-user network 320. Typically, management network 300 obtains the data though a "back-end integration". For example, communication distributor 324/workforce management server 326 may provide an application programming interface (API) for obtaining data. This API may be a representational state transfer (REST) API using HTTP, for instance. Using the API, management network 300 may (perhaps via proxy server(s) 328) place a request for data and receive a corresponding response, perhaps in the form of JavaScipt Object Notation (JSON) or eXtensible Markup Language (XML).

Sometimes, back-end integration becomes unavailable. For example, the entity that operates communication distributor 324/workforce management server 326 may differ from the entity that operates management network 300. If the two entities disagree on communication designs, then back-end integration may be unattainable. As another example, the entity that operates communication distributor 324/workforce management server 326 may choose to limit or restrict back-end access to protect sensitive information or prevent security risks. Other reasons for stopping back-end integration also exist, all of which may hamper the ability for management network 300 to perform operations on behalf of end-user network 320.

The present disclosure provides a technical improvement to management network 300 to address this and other issues. In particular, the embodiments herein provide systems and methods to monitor "embedded applications", which herein refer to components of communication distributor 324/workforce management server 326 that operate on agent instances within end-user network 320. Examples of embedded applications include softphone applications, scheduling applications, and so on. The idea here is that since embedded applications regularly communicate with communication distributor 324/workforce management server 326, monitoring the activity of these embedded applications provides valuable data to management network 300. After management network 300 collects information from the embedded applications on each individual agent instance, a complete state of end-user network 320 can be inferred.

The technical improvements described herein provide numerous advantages to both management network 300 and end-user network 320. For one, management network 300 (and/or proxy server(s) 328) need not maintain a back-end integration with communication distributor 324/workforce management server 326. Instead, management network 300 can utilize the aforementioned monitoring application to obtain data for performing operations on behalf of end-user network 320. This saves management network 300 significant time and resources, as setting up back-end integrations can be labor intensive and unduly time consuming. Furthermore, monitoring applications may monitor the activity of embedded applications not typically associated with communication distributor 324/workforce management server 326, for instance, chat applications, email application, and so on. Monitoring the activity of these applications provides management network 300 with additional, potentially highly valuable data. Other advantages and improvements are also possible and will be understood from the discussion herein.

Figure 9:
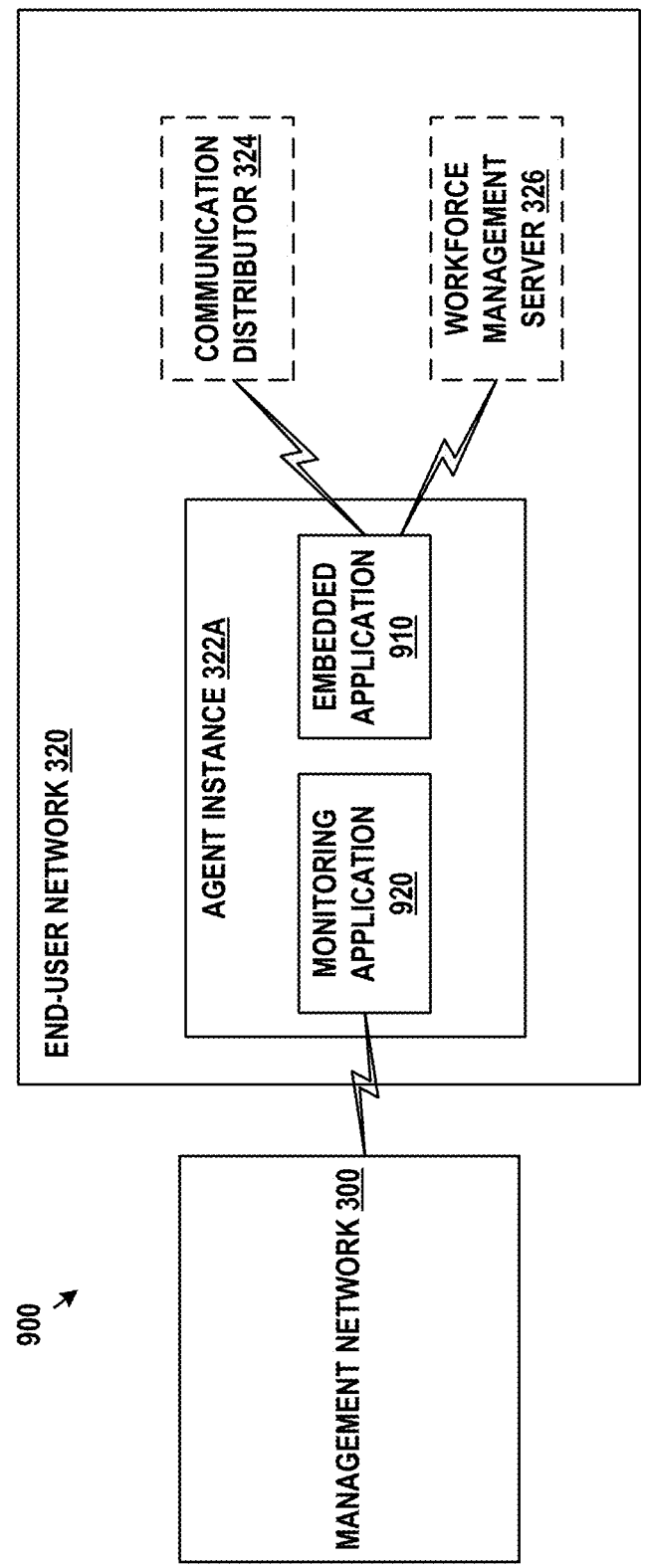
FIG. 9 depicts a network architecture for a monitoring application, in accordance with example embodiments.

FIG. 9 depicts network architecture 900, in accordance with example embodiments. Network architecture 900 includes management network 300 and end-user network 320. End-user network 320 includes agent instance 322A, communication distributor 324, and workforce management server 326. Note that agent instance 322A is used solely as an example agent instance; in reality the embodiments described herein can apply to any or all agent instance in end-user network 320.

As described above, management network 300 uses data from communication distributor 324/workforce management server 326 to perform operations on behalf of end-user network 320. For example, communication distributor 324 may provide queue information to management network 300 and workforce management server 326 may provide agent instance scheduling information to management network 300. Communication distributor 324/workforce management server 326 transmit data to management network 300 via proxy server(s) 328 (not shown).

In examples, communication distributor 324/workforce management 326 provide agent instance 322A with embedded application 910. Embedded application 910 may be thought of as a "client component" of communication distributor 324/workforce management server 326. For example, embedded application 910 may be a softphone application that provides an interface to respond to communications from communication distributor 326. As another example, embedded application 910 may be scheduling application that indicates to a user which work segment they are currently assigned to. Other embodiments of embedded application 910 are also possible.

In line with the discussion above, management network 300 may be unable to directly access data from communication distributor 324/workforce management server 326. To otherwise ascertain this data, management network 300 can use monitoring application 920. In examples, end-user network 320 installs monitoring application 920 onto agent instance 322A on behalf of management network 300. Upon installation, monitoring application 920 may be granted root privileges to agent instance 322A. That is, monitoring application 920 can read, modify and execute programs/files/directories on agent instance 322A. Since embedded application 910 is also installed on agent instance 322A, monitoring application 920 can leverage root privileges to monitor the operations of embedded application 910.

In some embodiments, monitoring application 920 operates on the network level to intercept packets sent from communication distributor 324/workforce management server 326 to embedded application 910. For example, monitoring application 920 may intercept TCP/IP packets by monitoring the network interface of agent instance 322A, for example, network interface 106. Monitoring application 920 can then determine patterns using these intercepted packets.

In some embodiments, monitoring application 920 uses an unsupervised learning algorithm to determine baseline patterns of the intercepted packets. The algorithm may then detect a variation from the baseline patterns. Depending on the source of the packets (e.g., whether from communication distributor 324/workforce management server 326), variations can be correlated, for example, to state changes for agent instance 322A, work segment changes for agent instance 322A, and so on.

In some embodiments, monitoring application 920 uses a machine learning model trained using a supervised or semi-supervised machine learning approach. During a training phase, the machine learning model could be trained with labeled data that includes intercepted packets from known conditions (e.g., packets intercepted during a state change). During a prediction phase, the trained machine learning model can be applied to unlabeled, intercepted packets sent from communication distributor 324/workforce management server 326 to embedded application 910.

The models/algorithms described above could be implemented using, for example, a logistic or linear regression, a support vector machine (SVM), a Bayes network, among other possibilities. A training phase could include evaluating how well the given model predicts an outcome given the labeled data as input. For example, the training phase could include determining a loss function based on a difference between the predicted outcome and the labeled outcome. Various optimization algorithms are possible, including maximum likelihood estimation (MLE) or other fitting algorithms. During the prediction phase, the machine learning model could be applied at run-time to predict or infer conditions based on the real-time network packets intercepted by monitoring application 920 from embedded application 910. These predictions may be transmitted to management network 300. In some cases, predictions are made on management network 300 itself.

In some embodiments, monitoring application 920 operates on a user interface of agent instance 322A. More specifically, monitoring application 920 may observe the user interface of agent instance 322A to detect pixel changes, color changes, and/or new objects that enter the interface. The idea here is that changes on the user interface may be correlated to commands sent from communication distributor 324/workforce management server 326 to embedded application 910. For example, if communication distributor 324 shifts agent instance 322A from "available" state to "in-communication state", the shift may materialize on the user interface of agent instance 322A as an image change. The machine learning models described above may similarly be trained/applied to ascertain changes on the user interface of agent instance 322A. FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves, providing, by one or more processors disposed within a management network and to agent instances in an end-user network, a monitoring application, where the management network has computing resources dedicated to the end-user network, where the end-user network contains the agent instances and one or more servers, where the one or more servers are operable to: (i) receive incoming communications, and (ii) assign one or more agent instances to service the incoming communications, and where the monitoring application is configured to store, in a computer readable medium, information associated with data received by the agent instances from the one or more servers.

Block 1010 involves receiving, at the management network and from the monitoring application, the stored information.

Block 1020 involves transmitting, to a rules engine associated with the end-user network, the stored information.

In some embodiments, the one or more servers are managed by an entity distinctly different than the management network.

In some embodiments, the one or more servers include at least one of: a workforce management server or a communication distributor server.

In some embodiments, receiving the stored information involves aggregating the stored information across the agent instances, and transmitting the stored information to the rules engine comprises transmitting the aggregated information.

In some embodiments, the one or more servers are configured to provide, to the agent instances, an embedded application. In these embodiments, the data received by the agent instances from the one or more servers is received by the embedded application and receiving, from the monitoring application, the stored information comprises the monitoring application observing the data received by the embedded application.

In some embodiments, observing the embedded application involves observing a graphical user interface component of the embedded application.

In some embodiments, observing the embedded application involves determining network traffic associated with the embedded application.

In some embodiments, the monitoring application has access to root privileges of the agent instances.

VI. Example Automated Actions

Every so often, end-user network 320 experiences a deviation from typical operations. For example, communication distributor 324 may undergo an unexpected spike in incoming communication volume. Or, several agent instances in contact center 322 may suddenly become unavailable. In these situations, an administrative team may act to resolve the deviation on behalf of end-user network 320. Specifically, the administrative team may manually evaluate data from various sources on end-user network 320 to perform appropriate adjustments. Example adjustments may include moving agent instances to service high volume channels, assigning agent instances to additional queues, scheduling additional agent instances, and so on.

While they provide some benefits, administrative teams generally cannot consistently and accurately make adjustments on behalf of end-user network 320. For one, the amount of data generated by end-user network 320 may be immense, and thus manually evaluating the data becomes unduly time consuming. Similarly, manually evaluating which adjustment to make at what time may be too difficult for the administrative team to handle. Rather than deal with these complications, the administrative team may start to increase their tolerance and react less frequently to address deviations, which becomes problematic for end-user network 320.

The present disclosure provides a technical improvement to management network 300 to address this and other issues.

In particular, the embodiments herein provide systems and methods to automatically analyze large volumes of data from end-user network 320, create conditions to evaluate this data, and identify specific actions to automatically take place on end-user network 320 when a deviation occurs. Moreover, the embodiments herein allow management network 300 to optimally target agent instances/subsystems on end-user network 320 that can best address the deviation. Advantageously, end-user network 320 need not spend time and resources to address deviations and instead can rely on management network 300 to provide adjustments. Other advantages and improvements are also possible and will be understood from the discussion herein.

Figure 11:
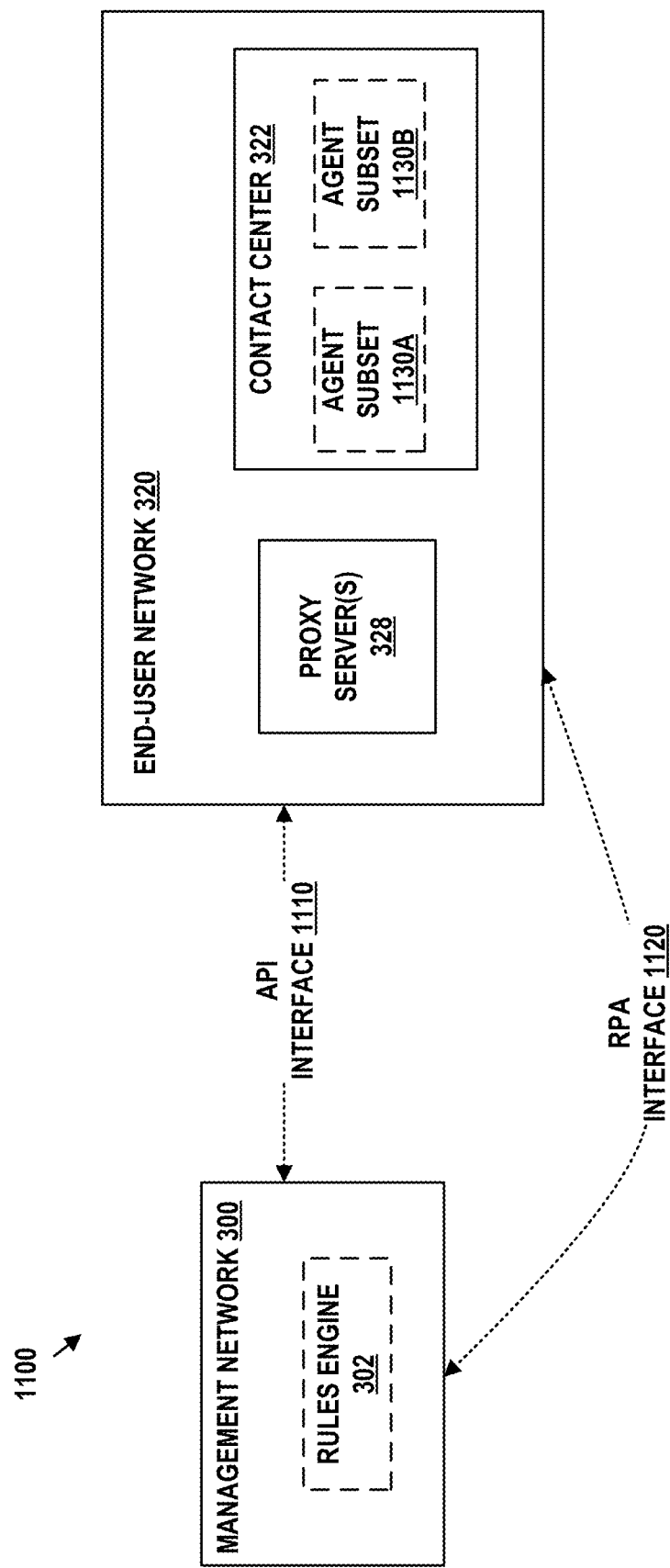
FIG. 11 depicts a network architecture for automated actions, in accordance with example embodiments.

FIG. 11 provides network architecture 1100 for automated actions, in accordance with example embodiments. Network architecture 1100 includes management network 300 and end-user network 320.

Management network 300 includes various devices and software services used to administer aspects of end-user network 320. Specifically, management network 300 may use rules engine 302 to identify one or more operations that should be performed on behalf of end-user network 320. In line with the discussion above, users from end-user network 320 may configure rules engine 302 to support custom operations. Management network 300 may also include other devices and software applications as described above, but these are omitted from FIG. 11 for purposes of simplicity.

End-user network 320 may be an enterprise network used by an entity for computing and communications tasks, as well as storage of data. To support its capabilities, end-user network 300 may include contact center 322 and proxy server(s) 328.

Contact center 322 may be a subnetwork of computing devices within end-user network 320. As shown in FIG. 11, contact center 322 includes agent subset 1130A and agent subset 1130B, each of which contains one or more agent instances. As briefly described with respect to FIG. 7C, an agent subset (or user group) refers to one or more agent instances with a same categorization. This may include being assigned to the same queue in communication distributor 320, being assigned to the same staffing group (e.g., have the same schedule assignment from workforce management server 326), being within the same geographic region (e.g., Southeast Regional Group), having the same skill set (e.g., Mobile Devices Group), and so on. In examples, agent subset 1130A and agent subset 1130B may be mutually exclusive (e.g., no overlapping agent instances). End-user network 320 may also include other devices and software applications as described above, but these are omitted from FIG. 11 for purposes of simplicity.

Proxy server(s) 328 may facilitate communication and movement of data between end-user network 320 and management network 300. In particular, proxy server(s) 328 may establish and maintain secure communication sessions with one or more computing devices of management network 300, such as rules engine 302. By way of such a session, management network 300 may be able to obtain data from and manage aspects of end-user network 320 and its components.

During a communication session, end-user network 320 transmits (e.g., in response to a request from management network 300) data to management network 300 and in turn management network 300 transmits commands to end-user network 320. Data transmitted from end-user network 320 to management network 300 may include, but is not limited to: queue level statistics from communication distributor 324, schedule information from workforce management server 326, agent state data from communication distributor 324, and so on. Commands transmitted from management network 300 to end-user network 320 may include, but are not limited to, changing the state of the agent instance on communication distributor 324, adding, modifying, or deleting work segments on workforce management server 326, moving an agent instance from one queue on the communication distributor 324 to a different queue in order to handle fluctuating call volume, logging an agent instance out of communication distributor 324, and so on.

In some embodiments, management network 300 transmits commands to end-user network 320 via API interface 1110. API interface 1110 may be provided as part of proxy server(s) 328, communication distributor 324, workforce management server 326, or perhaps another computational entity operating on end-user network 320. Management network 300 may transmit commands in the form of a REST, Simple Object Access Protocol (SOAP), or GraphQL request.

In some embodiments, management network 300 transmits commands to end-user network 320 via robotic process automation (RPA) interface 1120. RPA interface 1120 allows management network 300 to transmit commands to end-user network 320 via a graphical user interface. Specifically, RPA interface 1120 may be computer software that emulates actions of a human interacting with a graphical user interface. And since communication distributor 324 or workforce management server 326 may each have user interface components, RPA interface 1120 allows management network 300 to mimic a human clicking and taking actions on these user interface components. This allows management network 300 to transmit commands via the "front end", rather than through the "back-end" as with API interface 1110. In some embodiments, RPA interface 1120 is provided with authentication mechanisms for communication distributor 324 or workforce management server 326 and uses these mechanisms when transmitting commands to end-user network 320.

Figure 12:
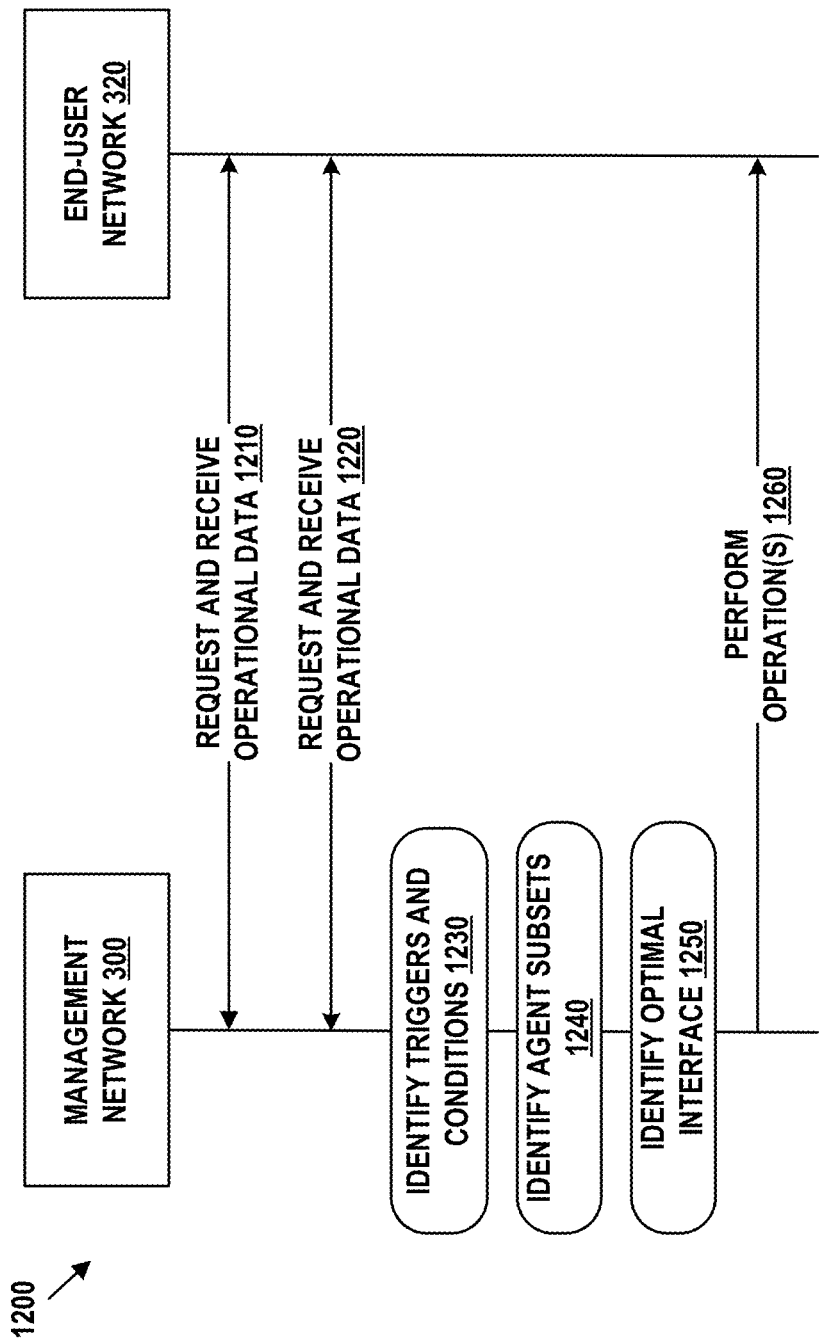
FIG. 12 depicts a message flow diagram, in accordance with example embodiments.

FIG. 12 depicts a message flow diagram for procedure 1200, in accordance with example embodiments. In particular, procedure 1200 may represent a specific sequence or series of actions that, when performed, allows management network 300 to perform operations on behalf of end-user network 320. By way of example, procedure 1200 may utilize management network 300 and end-user network 320 during operation. However, additional components, steps, or blocks, may be added to procedure 1200.

At step 1210, management network 300 may request and receive data from end-user network 320. This step may include, for example, rules engine 302 requesting and receiving data from proxy server(s) 328, as discussed above with respect to FIG. 6. The data received by management network 300 may include operational data related to communicator distributor 324, workforce management server 326, and/or other entities on end-user network 320.

The process of step 1210 may repeat for any number of times. Put differently, management network 300 requests and receives data from end-user network 320 in "real-time". For example, at step 1220, management network 300 again requests and receives data from end-user network 320. The time period between real time requests may vary. For example, the time period between step 1210 and step 1220 may be 1 ms, 1 s, or 10 s. Further, management network 300 may request data from different entities on end-user network 320 at different rates. For example, management network 300 may request operational data related to communicator distributor 324 every 1 ms while requesting operational data related to workforce management server 326 every 10 s. Other rates are also possible.

At step 1230, the real-time data received from end-user network 320 from steps 1210 and 1220 may be evaluated against the rules defined in rules engine 302. This may include, for example, (i) identifying that a trigger has been fired, (ii) identifying that conditions evaluate to true, and (iii) identifying operations that should be performed on behalf of end-user network 320. Again, step 1230 may represent a continuous step. That is, step 1230 may continuously occur as data is being received from end-user network 320.

At step 1240, management network 300 identifies one or more subsets of agent instances that pertain to the operations identified in step 1230. This may include, for example, identifying subsets that satisfy the logic selection 738 or identifying subsets that were selected via selection menu 734/selection dropdown 736. Others methods of selecting agent subsets may also exist.

At step 1250, management network 300 identifies the optimal interface for which to transmit the operations identified in step 1230. For example, management network 300 may identify API interface 1110 or RPA interface 1120 as the optimal interface to transmit operations. Optimality can be defined by which interface has the lowest latency, which interface is available (API interface 1110 may be cut off, for example), and other metrics.

At step 1260, management network 300 performs operations on behalf of end-user network 320. This may include, for example, performing the operations via the interface identified in step 1250 and performing the operations on the agent subsets identified in step 1240. Operations may include changing the operative state of each agent instance in a subset, modifying the work segments of each agent instance in a subset, and/or other operations.

As a specific example related to procedure 1200, management network 300 may be interested in performing adherence automation for the "Southeast Regional Group" of agent instances on end-user network 320. To do so, management network 300 may, at steps 1210 and 1220, request the state of each agent instance in end-user network 320 every 1 ms. Then at steps 1230 and 1240, management network 300 determines, via rules engine 302, all the agent instances in the Southeast Regional Group that have been in a "hold" state for greater than X seconds (e.g., X=30 s, 60 s). At step 1250, management network 300 identifies that API interface 1110 is optimal. Then at step 1260, management network 300 sends a message, via API interface 1110, to all the identified agent instances in the Southeast Regional Group asking if they require assistance.

Figure 13:
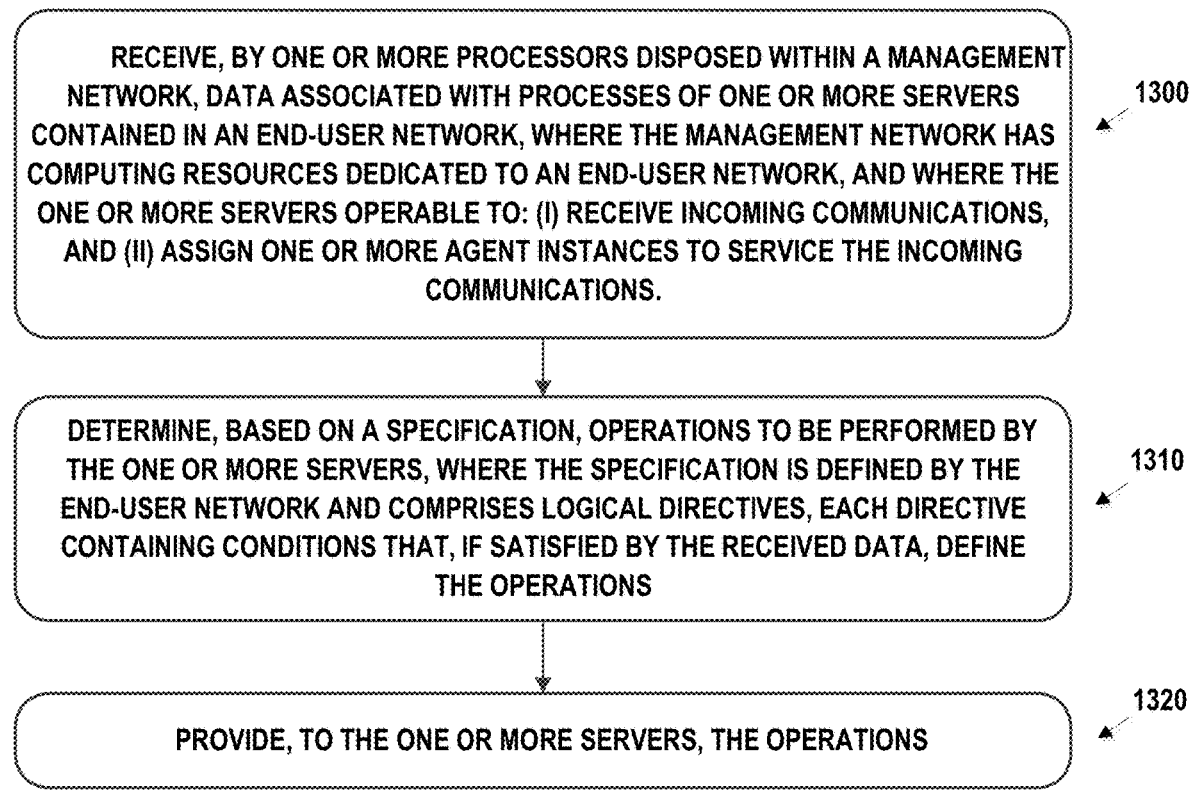
FIG. 13 is a flow chart illustrating an example embodiment.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 involves receiving, by one or more processors disposed within a management network, data associated with processes of one or more servers contained in an end-user network, where the management network has computing resources dedicated to the end-user network, where the end-user network contains agent instances, and where the one or more servers are operable to: (i) receive incoming communications, and (ii) assign one or more agent instances to service the incoming communications.

Block 1310 involves determining, based on a specification, operations to be performed by the one or more servers, where the specification is defined by the end-user network and comprises logical directives, each directive containing conditions that, if satisfied by the received data, define the operations, and Block 1320 involves providing, to the one or more servers, the operations.

In some embodiments, the one or more servers comprise a workforce management server and a communication distributor server.

In some embodiments, providing the operations comprises the management network making an application programming interface (API) request to the one or more servers by way of a wide-area network.

In some embodiments, making the API request to the one or more servers includes making an API request to a proxy server disposed on the end-user network.

In some embodiments, providing the operations comprises the management network logging on to the one or more servers by way of robotic process automation.

In some embodiments, the specification includes an authentication mechanism for the one or more servers, and where logging on to the one or more servers by way of robotic process automation comprises logging on to the one or more servers in accordance with the authentication mechanism.

In some embodiments, the operations include changing a state of a particular agent instance of the agent instances, modifying an assigned schedule for the particular agent instance, or modifying an assigned queue of the particular agent instance.

In some embodiments, the conditions include Boolean expressions.

In some embodiments, the tasks further comprise providing, to a subset of the agent instances, the operations, where a respective agent instance of the agent instances is in the subset if any or all queues to which the respective agent instance is serving are in compliance with the specification.

In some embodiments, the tasks further comprise providing, to a subset of the agent instances, the operations, where a respective agent instance of the agent instances is in the subset if any or all staffing groups to which the respective agent instance is associated are in compliance with the specification.

In some embodiments, the one or more servers are managed by an entity distinctly different than the management network.

VII. Examples for Processing High Volume Data

As described above, management network 300 constantly requests data from end-user network 320 to perform actions. This data may be split into individual data segments. For example, every state change in communication distributor 324, every work segment change in workforce management server 326, and every action taken by agent instances in contact center 322 may be recorded and transmitted as a data segment to management network 300. Undoubtedly, as end-user network 320 expands and adds additional agent instances, server devices, and so on, the data segments produced by end-user network 320 may start to balloon.

A common solution to handle ballooning data segments is to add additional computing resources (e.g., databases, virtual machines, software applications, and/or other resources) to increase data throughput. These resources are typically leased via public-cloud providers (e.g., AMAZON WEB SERVICES® and MICROSOFT® AZURE®) and can be dynamically scaled to meet data requirements. However, in non-public-cloud environment, such a solution may be unfeasible. For example, due to privacy concerns, management network 300 may operate using a private-cloud environment and thus the ability to dynamically scale and meet data demands may be limited. Consequently, other methods to efficiently process high volume data from end-user network 320 may be desirable.

The present disclosure provides a technical improvement to management network 300 to address this and other issues. In particular, the embodiments herein provide systems and methods to process large volumes of data from end-user network 320 by appropriately assigning time to live (TTL) values to data segments and dropping unnecessary data segments. Advantageously, the embodiments herein may increase the data throughput of management network 300 without scaling computing resources. Other advantages and improvements are also possible and will be understood from the discussion herein.

Figure 14:
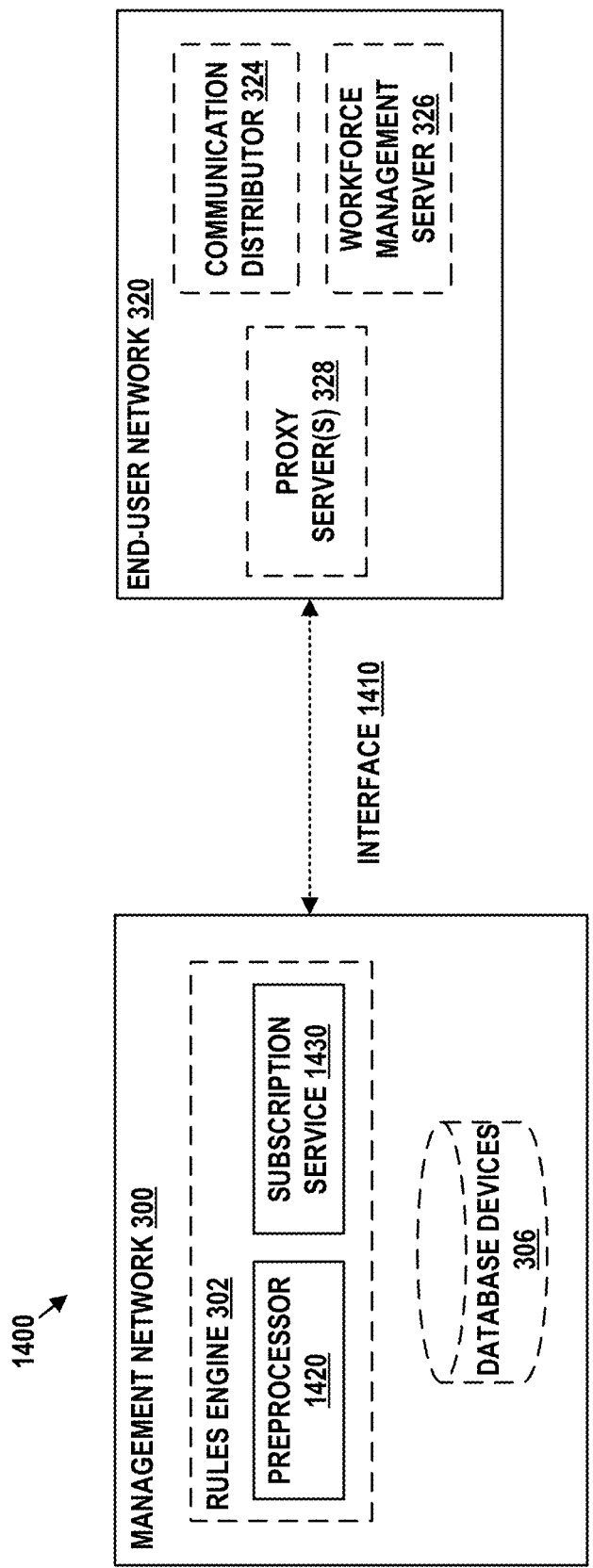
FIG. 14 depicts a network architecture for processing data, in accordance with example embodiments.

FIG. 14 depicts network architecture 1400, in accordance with example embodiments. Network architecture 1400 includes management network 300 and end-user network 320. Communication between management network 300 and end-user network 320 may be established via interface 1410.

End-user network 320 may be an enterprise network used by an entity for computing and communications tasks, as well as storage of data. To support its capabilities, end-user network 320 may include proxy server(s) 328, communication distributor 324, and workforce management server 326. End-user network 320 may also include other devices and software applications as described above, but these are omitted from FIG. 14 for purposes of simplicity.

Management network 300 includes various devices and software services used to administer aspects of end-user network 320. To support its capabilities, management network 300 may include rules engine 302. Management network 300 may also include other devices and software applications as described above, but these are omitted from FIG. 14 for purposes of simplicity.

As described, rules engine 302 may operate to identify one or more operations that should be performed on behalf of end-user network 320. To do so, rules engine 302 requests and receive data segments from end-user network 320 (e.g., via proxy server(s) 328). Data segments may be individually processed by rules engine 302 to determine whether an operation should be performed. But processing many data segments may be computationally expensive. Therefore, to efficiently process high volume data from end-user network 320, rules engine 302 may utilize preprocessor 1420 and subscription service 1430.

Preprocessor 1420 includes various devices and software services to truncate data pulled into rules engine 302. Specifically, during the execution of a rule in rules engine 302, preprocessor 1420 may discontinue processing a data segment if it determines that the data segment will not qualify for an action at the end of the rule. To do this, preprocessor 1420 examines whether the data segment relates to any trigger/condition specified in rules engine 302. For example, rules engine 302 may not have any triggers/conditions for when an agent instance changes state from "idle" to "on communication". Accordingly, preprocessor 1420 may drop all data segments in which an agent instance changes state from "idle" to "on communication", as those data segments will never result in an action. This saves rules engine 302 computational time, as the data segment no longer needs to be fully processed.

Subscription service 1430 includes various devices and software services to limit that amount of data pulled into rules engine 302. Specifically, subscription service 1430 will only pull data from end-user network 320 if there is a rule associated with that data. For example, if rules engine 302 has no rules pertaining to queue length in communication distributor 324, then subscription service 1430 ensures that no data pertaining to queue length is pulled into management network 300.

In general, the idea behind preprocessor 1420 and subscription service 1430 is to truncate/limit unnecessary data to maximize high volume data flow from end-user network 320 to management network 300. In addition to this, management network 300 may also be interested in dropping data segments that become "irrelevant", or in other words, a data segment that no longer pertains to any action in rules engine 302. As an example, management network 300 may receive two data segments from the same agent instance. Both data segments may contain a state change for the agent instance (e.g., one data segment contains a state change from "available" to "in-communication", while the other data segment contains a state change from "training" to "available"). Yet, the earlier state change is irrelevant, as it is superseded by the later state change. To account for this, each data segment may be assigned a time to live (TTL) upon being received at management network 300. When the data segment's TTL expires, the data segment may be dropped by management network 300. This prevents network congestion from "older" data segments that are not relevant to management network 300.

Assigning TTL values may be complex. For one, to ensure that dropped data segments will be replaced by new data segments, assignments should account for the rate in which management network 300 receives data. Further, assignments of TTL values should depend on the location of the data segment within management network 300. For example, because of extra memory capacity, database devices 306 may need to drop packets less frequently than rules engine 302. Additionally, the assignments of TTL values should not only be for data ingested by management network 300, but should be similarly applied for commands/operations being transmitted from management network 300 to end-user network 320. The systems and methods herein provide a technical improvement to management network 300 that can address these issues.

Figure 15:
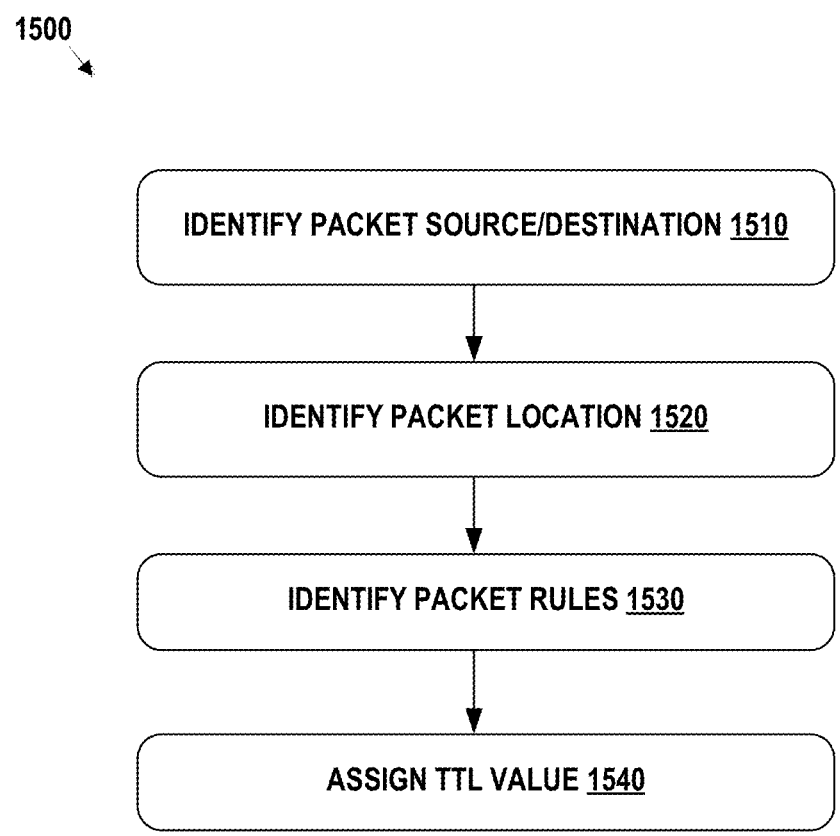
FIG. 15 depicts a method for assigning a time to live (TTL) value, in accordance with example embodiments.

FIG. 15 depicts method 1500, in accordance with example embodiments. In particular, method 1500 may represent a specific sequence or series of actions that, when performed, allows management network 300 to evaluate and assign a TTL value to a data segment. By way of example, method 1500 may be performed by or on any computational entity on management network 300 that wishes to evaluate and assign a TTL value to a data segment, for example, database devices 306 or rules engine 302. Moreover, additional components, steps, or blocks, may be added to method 1500 without departing from the scope of the method.

At step 1510, the source/destination of a data segment is identified. For example, the source/destination of a data segment can be identified via data segment's header (e.g., source/destination IP address from an IP header, a source/destination port from the TCP header, a source/destination MAC address an Ethernet frame header, etc.). As another example, the data segment could contain/be part of a message payload, which can be parsed to glean the source/destination of the data segment. Other methods of identifying the source/destination are also possible.

As an example related to step 1510, if the source/destination of a data packet is communicator distributor 324, then a smaller TTL value may be assigned to the data packet, as management network 300 may constantly receive data from/transmit commands to communicator distributor 324. On the other hand, if the source/destination of a data packet is workforce management server 326, then a larger TTL value may be assigned to the data packet, as management network 300 may sporadically receive data from/transmit commands to workforce management server 326.

At step 1520, the location of the data segment in management network 300 is identified. For example, the data segment may be stored in database devices 306 and/or may be waiting to undergo evaluation in rules engine 302. And if management network 300 utilizes buffers (e.g., message queues) to ensure guaranteed delivery of incoming data and outgoing operations, then the data segment may reside in a buffer on management network 300. Each location may have different TTL needs. For example, buffers may process data quickly, thus assigning short TTL values to data segments within buffers is preferred. On the other hand, database devices 306 persist data segments for later reporting. Thus, longer TTL values may be assigned to data segments in database devices 306.

At step 1530, custom rules relating to the data segment are identified. Custom rules may be provided by users from end-user network 320. For example, due to an internal business decision, a user may want to quickly expire data received from communication distributor 324.

At step 1540, a TTL value is assigned to the data segment. In particular, step 1540 uses the identifications from steps 1510, 1520, and 1530 to appropriately assign a TTL value to the data segment. In some embodiments, the identifications from steps 1510-1530 may each be weighted to indicate how much each identification should contribute to the assigned TTL value.

Figure 16:
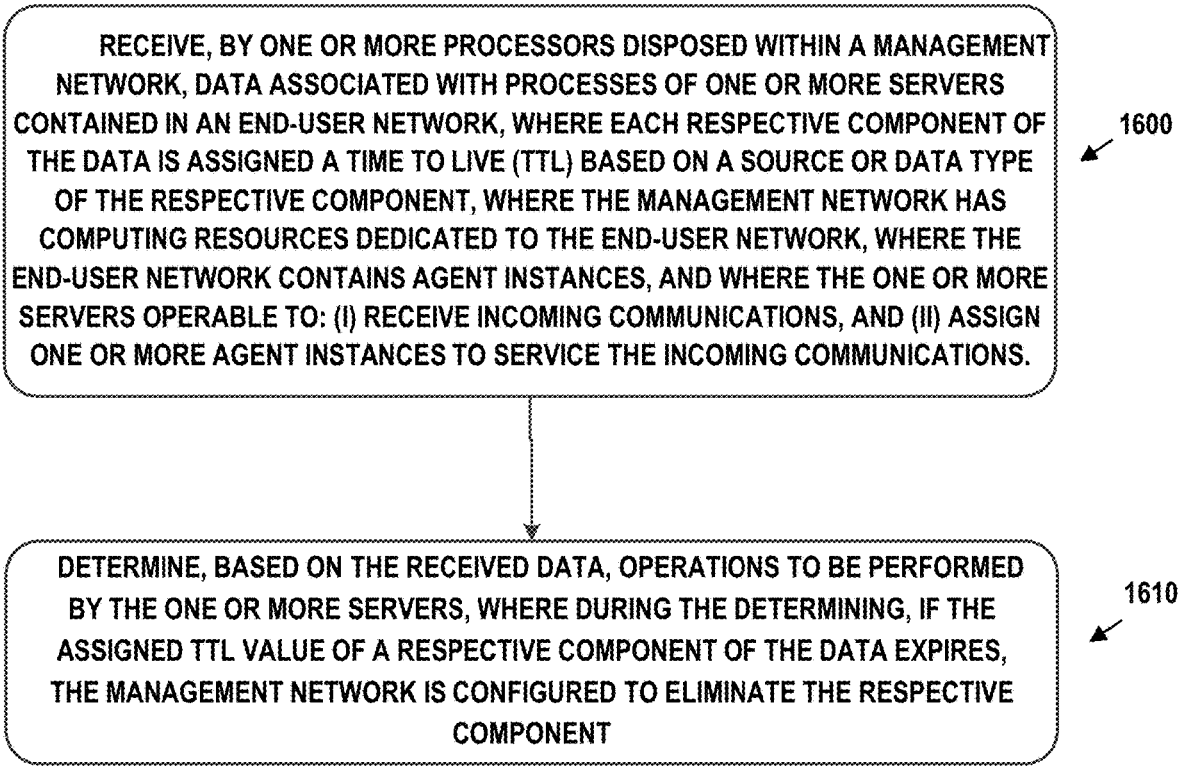
FIG. 16 is a flow chart illustrating an example embodiment.

FIG. 16 is a flow chart illustrating an example embodiment. The process illustrated by FIG. 16 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 16 may be simplified by the removal of any one or more of the features shown therein. Further, these embodiments may be combined with features, aspects, and/or implementations of any of the previous figures or otherwise described herein.

Block 1600 involves receiving, by one or more processors disposed within a management network, data associated with processes of one or more servers contained in an end-user network, where each respective component of the data is assigned a time to live (TTL) based on a source or data type of the respective component, where the management network has computing resources dedicated to the end-user network, where the end-user network contains agent instances, and where the one or more servers are operable to: (i) receive incoming communications, and (ii) assign one or more agent instances to service the incoming communications.

Block 1610 involves determining, based on the received data, operations to be performed by the one or more servers, where during the determining, if the assigned TTL value of a respective component of the data expires, the management network is configured to eliminate the respective component.

Some embodiments involve transmitting, to the end-user network, the operations, where each respective operation is assigned a TTL value based on an end destination or data type of the respective operation, and where during the transmitting, if the TTL value of the respective operation expires, the remote management service is configured to eliminate the respective operation.

In some embodiments, the data type of the respective component is determined by a header of the respective component.

In some embodiments, the operations to be performed by the one or more servers are determined based on a specification that is defined by the end-user network, where the specification comprises logical directives, each directive containing conditions that, if satisfied by the received data, define the operations.

In some embodiments, for each respective directive of the logical directives, if a component of the received data will fail to satisfy at least one condition of the conditions associated with the respective directives, the management network is configured to prevent the respective directive from evaluating the component of the received data.

In some embodiments, receiving data associated with the processes of the one or more servers involves the management network requesting, from a proxy server disposed on the end-user network, data associated with at least one directive from the logical directives.

VIII. Example Systems and Methods for Identifying Valuable Actions

As previously described, end-user network 320 may experience unexpected deviations from typical operations. For example, communication distributor 324 may experience a spike in communication volume or other unexpected service issues may arise. To handle the deviations, management network 300 makes adjustments/takes actions on behalf of end-user network 320. Example adjustments may include moving agent instances to service high volume channels, assigning agent instances to additional queues, scheduling additional agent instances, and so on.

In some cases, management network 300 may take one of several actions to handle an unexpected deviation. For example, management network 300 may deal with the spike in communication volume by scheduling additional agent instances to service the extra communications or by reassigning current agent instances, for example agent instances that are in a "training" state, to service the extra communications. Each action has its own benefits and drawbacks. For example, scheduling additional agent instances may improve response time, but may result in additional costs for end-user network 320. Reassigning current agent instances may also improve response time, but may prevent the reassigned agent instances from receiving critical training modules. It may not be immediately obvious which action provides greater benefit to end-user network 320, and thus ascertaining the optimal action to take at what time can become a challenging task.

The present disclosure provides a technical improvement to management network 300 to address this and other issues. In particular, the embodiments herein provide systems and methods to automatically determine optimal actions for management network 300 to perform on behalf of end-user network 320 at any given time. Advantageously, the embodiments herein allow end-user network 320 to simply specify constraints and objectives, through which management network 300 may use to deduce optimal actions. This saves end-user network 320 time and resources, as there is no longer a need for a manual analysis of optimal actions. Other advantages and improvements are also possible and will be understood from the discussion herein.

Figure 17:
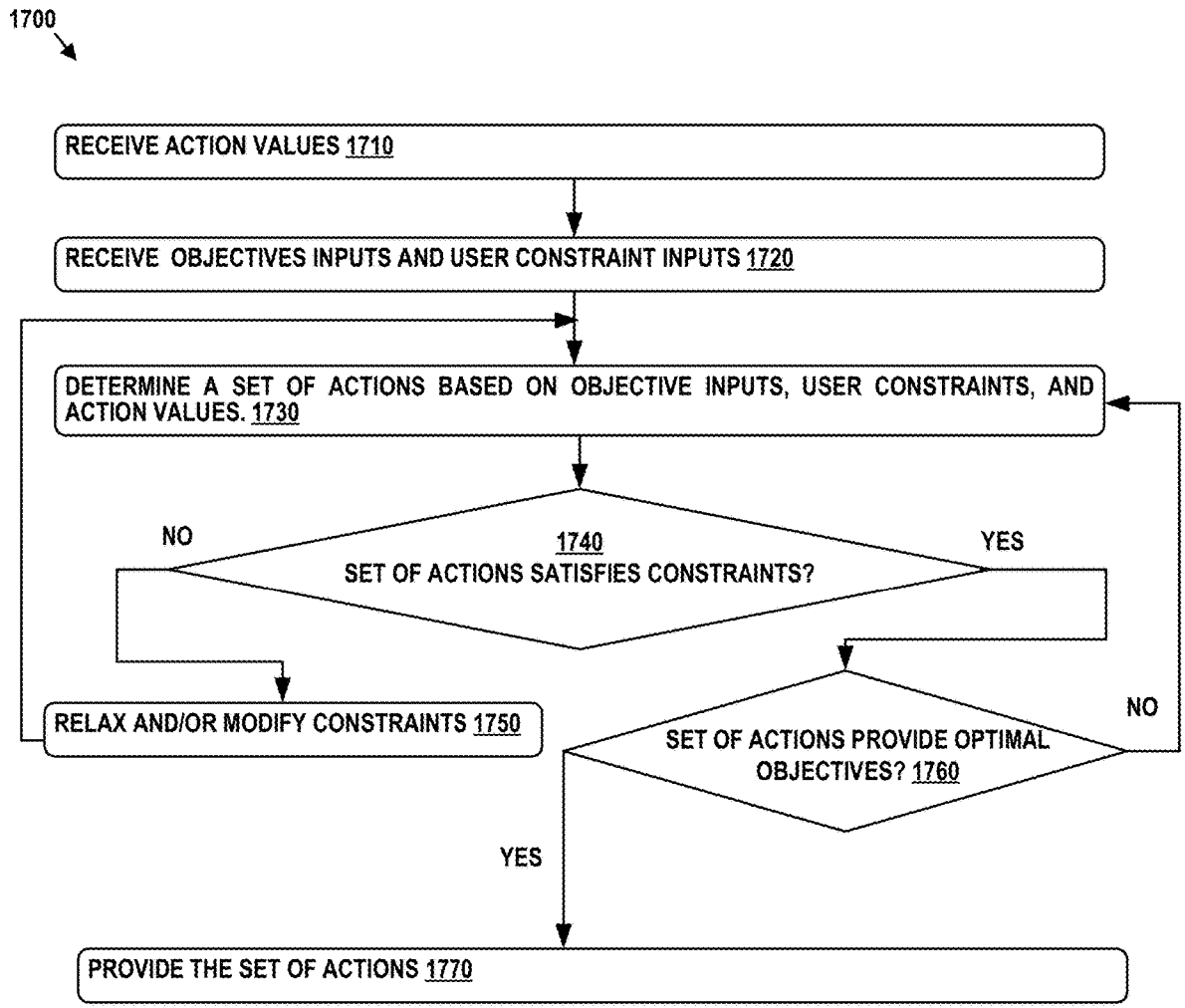
FIG. 17 illustrates a method for determining optimal actions, in accordance with example embodiments.

FIG. 17 is a flowchart of method 1700, in accordance with an example embodiment. Method 1700 may represent a specific sequence or series of actions that, when performed, allows management network 300 to determine a set of optimal actions/operations to perform on behalf of end-user network 320. Method 1700 can be carried out by a computing device, such as computing device 100. Moreover, additional components, steps, or blocks, may be added to method 1700 without departing from the scope of the method.

Method 1700 can begin at block 1710, where the computing device receives action values. As referred to herein, an action value is a numerical value assigned to an operation performed by management network 300 on behalf of end-user network 320. In particular, the action value indicates how performing that operation affects an operational metric. Operational metrics were previously described with respect to FIGS. 7B and 7C. For example, the operation of moving an agent instance from "available" state to "in-communication" state may be assigned an action value related to a cost metric. More specifically, moving the agent instance from "available" state to "in-communication" may decrease the cost metric by $X.

A single operation/action performed by management network 300 may be associated with many action values. Continuing from the example above, the operation of moving an agent instance from "available" state to "in-communication" state may similarly be assigned an action value related to a service level metric. More specifically, moving the agent instance from "available" state to "in-communication" may increase the service level metric by X percent. Other types of action values are also possible.

In some embodiments, management network 300 determines action values by evaluating operations applied on end-user network 320 over a given time period. For example, throughout a given time period, management network 300 may perform operations on behalf of end-user network 320. Management network 300 may track each operation performed. Then at the end of the time period, management network 300 can determine how much each action performed contributed to a final operational metric, thereby deducing action values.

In some embodiments, users from end-user network 320 can specify action values. For example, a user from end-user network 320 can specify, using a series of one or more web pages and/or web-based applications deployed upon the management network 300 and provided to authorized users from end-user network 320 upon request, that assigning an additional work segment to an agent instance increases a cost metric by $X and decreases an average speed of answer metric by Y seconds.

In some embodiments, management network 300 determines action values by analyzing networks similar to end-user network 320. For example, end-user network 320 may be associated with a logistics enterprise and management network 300 may provide services to other networks associated with logistics enterprises. The idea here is that action values determined for these other networks may be suitable for end-user network 320. In particular, unsupervised learning algorithms, for example k-means clustering, can be used to identify similar networks to end-user network 320.

In some embodiments, management network 300 may have predefined action values. For example, management network 300 may recognize that every time an agent instance changes into a "training" state, the value for a "training completion" metric goes up by Z.

At block 1720, the computing device receives objective inputs and constraint inputs, each of which is discussed in detail below.

Constraint inputs can provide user-specified constraints on operational metrics. Examples of constraints include, but are not limited to, cost-based constraints (e.g., a schedule has to cost less than $X), queue-based constraints (e.g., no queue in communication distributor 324 should have a waiting time of more than Y seconds), agent instance related constraints (the time in which the agent is available to handle customer interactions), service level constraints (the service level should be between 80-90%), and combinations of these types of constraints (e.g., a schedule has to cost less than $X and also the average waiting time should be less than Z seconds). Other types of constraint inputs are also possible. The set of actions determined by the computing device should be able to meet some, and perhaps all, of the specified constraints.

In some embodiments, when multiple constraints are specified, one or more constraints can be prioritized over other constraints. Constraints can be prioritized based on user input. As an example, constraints can be scored using a multi-valued priority scheme using a 3-2-1-0 scale of priorities, where a high priority for a constraint has a value of 3, a medium priority for a constraint has value of 2, a low priority for a constraint has a value of 1, and a zero priority for a constraint has a value of 0. Other example scales of priorities can use different values than used in the 3-2-1-0 scale.

Objective inputs may include numerical goals for operational metrics. Example objective inputs may include minimizing costs, maximizing a service level of end-user network 320, and so on. In some cases, multiple objectives can be specified. For example, objective inputs can include minimizing costs while maximizing the service level for a specific communication queue in communication distributor 324. In these cases, each of the multiple objectives can be prioritized as similarly described above. Other types of objective inputs are also possible.

At block 1730, the computing device determines a set of actions based on the objective inputs and user constraints from block 1720 and the actions values from block 1710. For example, the computing device may use the objectives, constraints, and action values to formulate an optimization problem. If the constraints solely include linear constraints, then the optimization problem may be solved by a linear programming or other linear solution technique. If the constraints include non-linear constraints, then non-linear techniques may be used to solve the optimization problem. The optimization problem can be formulated as a maximization problem or a minimization problem.

At block 1740, the computing device determines whether the set of actions determined by block 1730 satisfies all constraints from block 1720. Using the service level example above, the computing device may determine whether the values for the set of actions result in the service level being between 80-90%. This can entail, for example, adding the action value for each action in the set of actions. If the computing device determines that the set of actions does not satisfy the constraints, then method 1700 can proceed to block 1750. Otherwise, computing device 1400 can determine that the set of actions satisfies and method 1700 can proceed to block 1760.

At block 1750, the computing device can modify/relax constraints in order to satisfy the unsatisfied constraints specified in block 1720. Upon completion of block 1750, method 1700 can proceed back to block 1730 to determine a new set of actions using the modified/relax constraints. Generally speaking, blocks 1730, 1740, and 1750 form feedback loop by gradually modifying/relaxing constraints until all unsatisfied constraints become satisfied by the set of actions.

In some embodiments, priority information can be used to relax constraints. For example, if no set of actions can be determined that satisfy all constraints indicated in block 1720, then constraints associated with relatively-low-priority tasks can be relaxed and/or eliminated. Then, a search for a set of actions that satisfy the now-relaxed constraints can be performed.

In some embodiments, numerical technique can be used to relax constraints. For example, if eliminating a cost-based constraint allows searching through 50 additional sets of actions, while eliminating a service level based constraint allows searching through 75 additional sets of actions (or vice versa), then eliminating or relaxing the cost-based constraint can be prioritized over eliminating or relaxing the service level based constraint (or vice versa).

At block 1760, the computing device determines whether the set of actions determined by block 1730 provides the optimal objective value for the objective input(s) from block 1720. For example, the computing device can compare the set of actions to a previously stored set of actions to determine whether the objective value for the objective input is more optimal than the previously stored set of actions. As another example, the computing device can compare the objective value for the objective input to a predefined threshold value. If the computing device determines that the set of actions provides the optimal objective value, then method 1700 can proceed to block 1770. Otherwise, method 1700 can proceed back to block 1730 to determine a new set of actions. Generally speaking, blocks 1730, 1740, and 1760 form another feedback loop by gradually determining new sets of actions until a minimum/maximum objective(s) is achieved. In some embodiments, the computing device may keep executing the feedback loop of blocks 1730, 1740, and 1760 for a predefined number of iterations and may exit the loop by proceeding to block 1770 on the last iteration.

At block 1770, the computing device can provide the set of actions. This can involve, for example, providing the set of actions to rules engine 302 to use in performing operations on behalf of end-user network 320.

Figure 18:
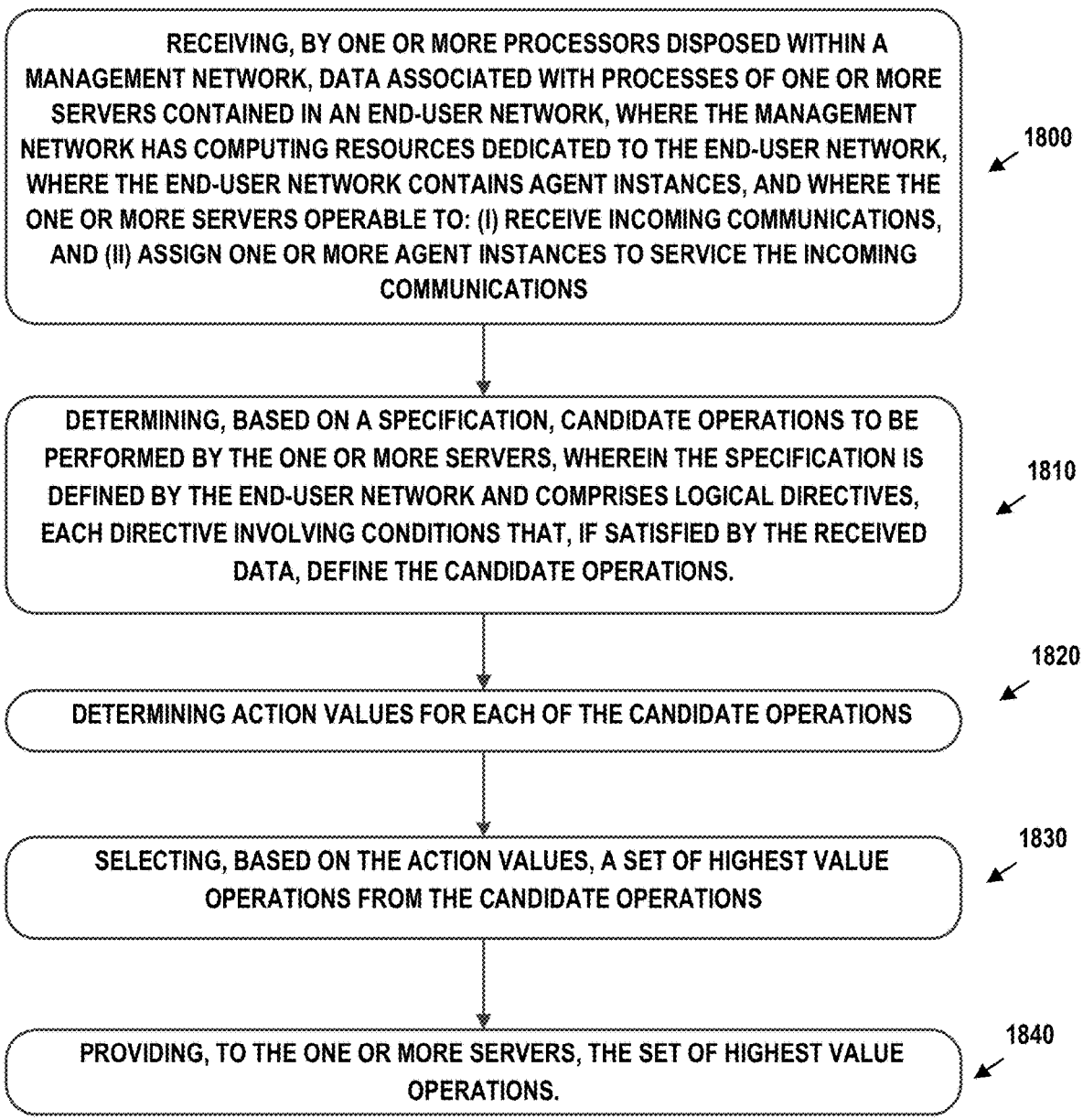
FIG. 18 is a flow chart illustrating an example embodiment.

FIG. 18 is a flow chart illustrating an example embodiment. The process illustrated by FIG. 18 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 18 may be simplified by the removal of any one or more of the features shown therein. Further, these embodiments may be combined with features, aspects, and/or implementations of any of the previous figures or otherwise described herein.

Block 1800 involves receiving, by one or more processors disposed within a management network, data associated with processes of one or more servers contained in an end-user network, where the management network has computing resources dedicated to the end-user network, where the end-user network contains agent instances, and where the one or more servers are operable to: (i) receive incoming communications, and (ii) assign one or more agent instances to service the incoming communications.

Block 1810 involves determining, based on a specification, candidate operations to be performed by the one or more servers, where the specification is defined by the end-user network and comprises logical directives, each directive involving conditions that, if satisfied by the received data, define the candidate operations Block 1820 involves determining action values for each of the candidate operations.

Block 1830 involves selecting, based on the action values, a set of highest value operations from the candidate operations, and Block 1840 involves providing, to the one or more servers, the set of highest value operations.

IX. Example Coaching Systems

As previously described, end-user network 320 may experience unexpected deviations from typical operations. For example, communication distributor 324 may experience a spike in communication volume or other unexpected service issues may arise. End-user network 320 can make internal adjustments to handle these deviations. Example adjustments may include moving agent instances to service high volume channels, assigning agent instances to additional queues, scheduling additional agent instances, and so on.

Sometimes, the adjustments made by end-user network 320 adversely impact pre-scheduled events (e.g., events that are scheduled to occur at a specific time in the future). An example of a pre-scheduled event is a coaching session, which, as used herein, refers to a training session for agent instances on end-user network 320. Coaching sessions may depend on both (i) the availability of a supervisor instance (a computer device and/or system within end-user network 320 that is assigned administrative privileges/granted greater authoritative rights on end-user network 320 than agent instances) from end-user network 320 to administer a coaching session, and (ii) the availability of one or more agent instances to receive a coaching session. In examples, coaching sessions involve either a single agent instance communicating with a supervisor instance or multiple agent instances (perhaps an agent subset or user group as discussed in FIG. 11) communicating with a supervisor instance.

To ensure the availability of agent instances and supervisors instances, end-user network 320 often pre-schedules coaching sessions based on forecasted communication volume and/or forecasted work segments for agent instances. But if end-user network 320 experiences a higher communication volume than forecasted, the pre-scheduled coaching sessions may be rescheduled or even canceled so that the agent instances can remain available to service the additional communications. This negatively impacts the ability for end-user network 320 to consistently deliver coaching sessions to agent instances.

To solve this issue, end-user network 320 may decide to add auxiliary agent instances, with the notion that the auxiliary agent instances can handle the additional incoming communications while other agent instances undergo coaching sessions. But this solution results in an unnecessary cost for end-user network 320.

The present disclosure provides a technical improvement to management network 300 to address this and other issues. In particular, the embodiments herein provide systems and methods to automatically determine optimal times to initiate coaching sessions with agent instances. The embodiments allow end-user network 320 to provide one or more conditions to management network 300, which uses the conditions to (i) determine whether a supervisor instance from end-user network 320 is available to administer a coaching session, (ii) determine segments of idle time for agent instances on end-user network 320, and (iii) initiate coaching sessions during the identified idle time segments, either to individual agent instances or groups of agent instances. This saves end-user network 320 time and resources, as there is no longer a need to allocate auxiliary agent instances and the challenge of having to pre-schedule/cancel coaching sessions at various times is resolved. Other advantages and improvements are also possible and will be understood from the discussion herein.

Figure 19:
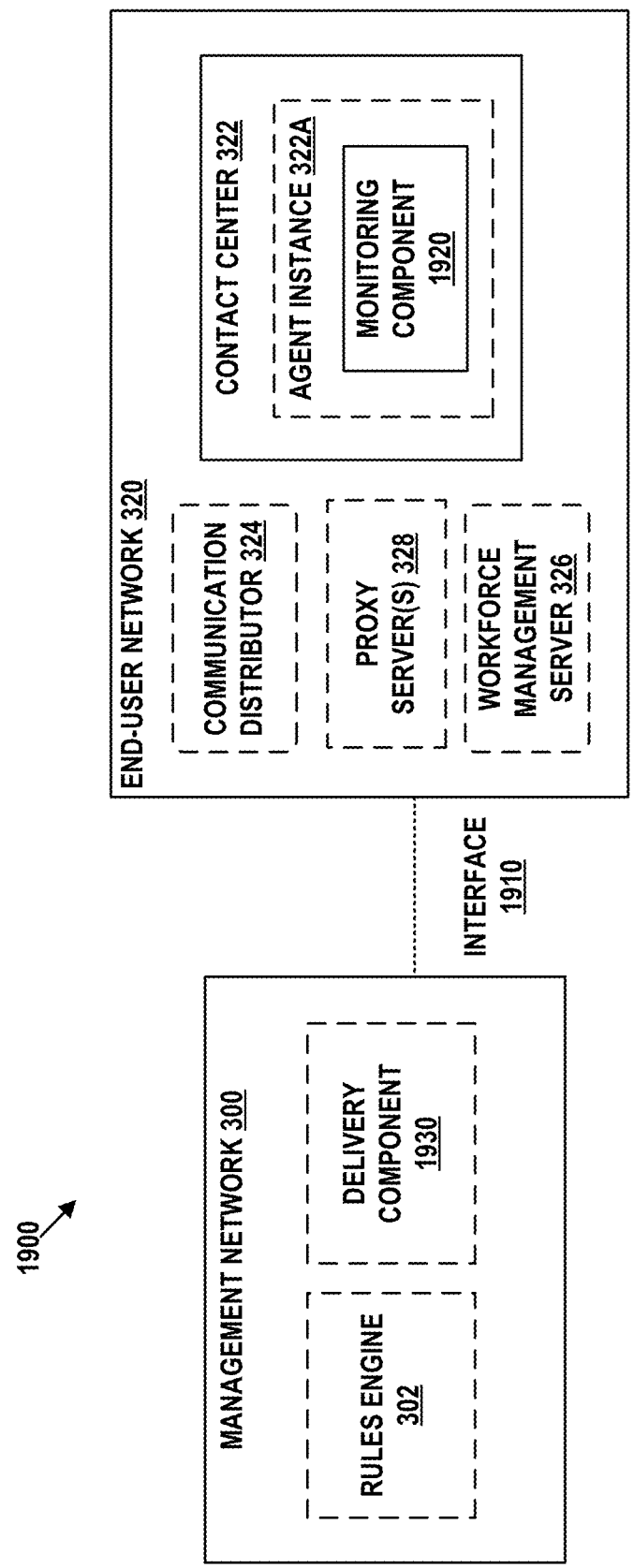
FIG. 19 depicts a network architecture, in accordance with example embodiments.

FIG. 19 depicts network architecture 1900, in accordance with example embodiments. Network architecture 1900 includes management network 300 and end-user network 320. Communication between management network 300 and end-user network 320 may be established via interface 1910.

End-user network 320 may be an enterprise network used by an entity for computing and communications tasks, as well as storage of data. To support its capabilities, end-user network 320 may include contact center 322, communication distributor 324, workforce management server 326, and proxy server(s) 328. Contact center 322 may include one or more agent instances, including agent instance 322A. Note that agent instance 322A is used solely as an example agent instance; in reality the embodiments described herein can apply to any or all agent instances in end-user network 320.

As shown in FIG. 19, agent instance 322A includes monitoring component 1920, which may monitor the communications of agent instance 322A with customers to determine if agent instance 322A is available for other activities (e.g., a coaching session). Monitoring component may act similarly to monitoring application 920 as described above with respect to FIG. 9. Monitoring component 1920 may transmit data from its activities to management network 300 via interface 1910.

End-user network 320 may also include other devices and software applications as described above, but these are omitted from FIG. 19 for purposes of simplicity.

Management network 300 includes various devices and software services used to administer aspects of end-user network 320. To support its capabilities, management network 300 may include rules engine 302 and delivery component 1930. Management network 300 may also include other devices and software applications as described above, but these are omitted from FIG. 19 for purposes of simplicity.

As described above, rules engine 302 may continuously receive data from the operations of communication distributor 324/workforce management server 326 (e.g., via proxy server(s) 328 or monitoring component 1920). With the received data, rules engine 302 may determine a current state of end-user network 320. As an example, the current state of end-user network 320 may include information on the current agent state and/or current work segment for each agent instance in end-user network 320. Rules engine 302 may also receive one or more conditions entered by users from end-user network 320. Conditions were described above with respect to FIG. 7. With these conditions and the current state of end-user network 320, rules engine 302 can identify one or more agent instances that are currently available to receive a coaching session. For example, a condition may specify that all agent instances currently in the "on-break" state are eligible to receive a coaching session.

Additionally, rules engine 302 may receive input data from a supervisor instance of end-user network 320. The input data may identify whether the supervisor instance can administer a coaching session.

Delivery component 1930 can initiate a time bound coaching session between (i) supervisor instances that are available to administer a coaching session and (ii) agent instances that are available to receive a coaching session. As described above, coaching sessions can be initiated between either a single agent instance and a supervisor instance or multiple agent instances (perhaps an agent subset or user group as discussed in FIG. 11) and a supervisor instance. In some embodiments, the time bound coaching session includes a HTTP session, a TCP session, a Session Initiation Protocol (SIP) session, a chat session, or a video session. The time bound coaching session may span the period of 10 minutes, 15 minutes, or 30 minutes, among other possibilities.

Figure 20:
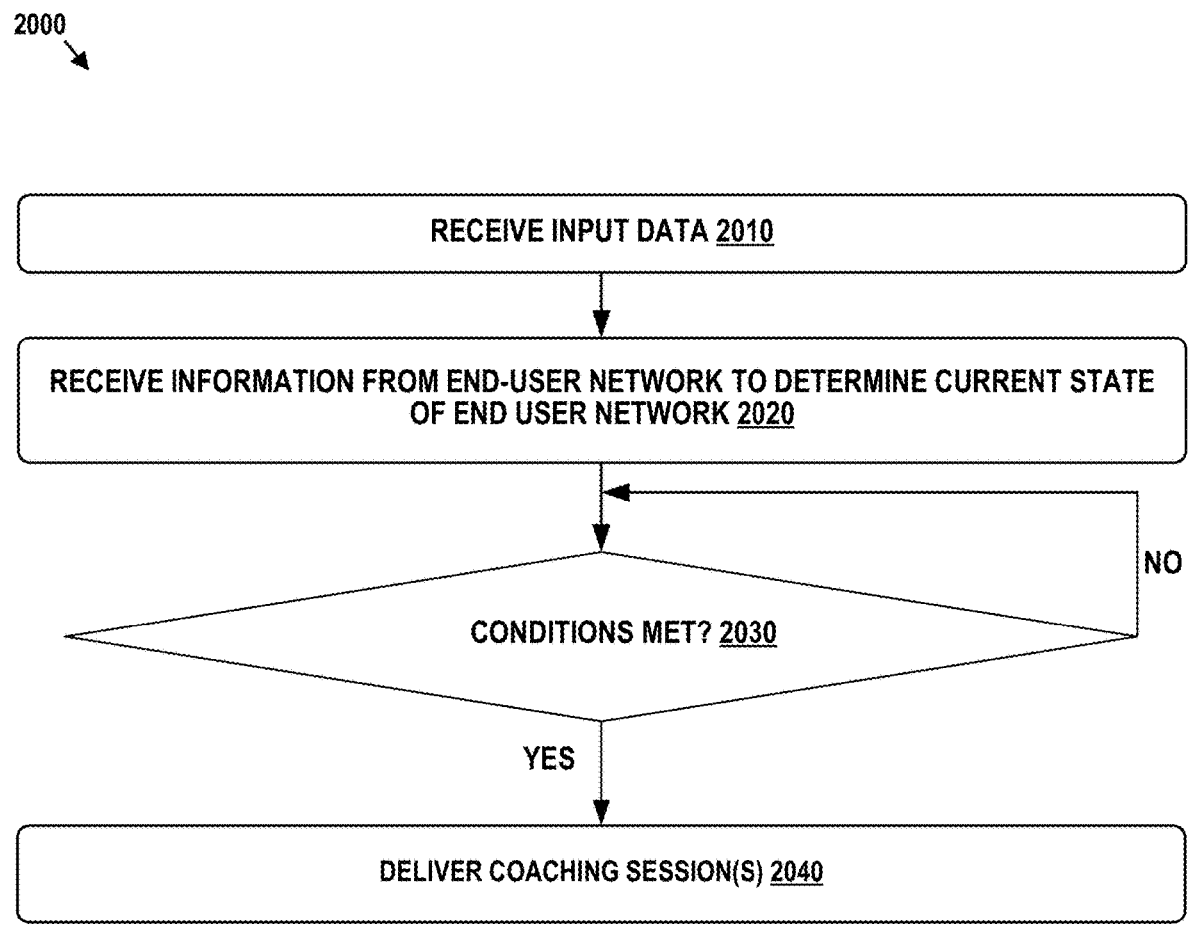
FIG. 20 illustrates a method for determining optimal actions, in accordance with example embodiments.

FIG. 20 is a flowchart of method 2000, in accordance with an example embodiment. Method 2000 may represent a specific sequence or series of actions that, when performed, allows management network 300 to schedule coaching sessions for agent instances on end-user network 320. Method 2000 can be carried out by a computing device, such as computing device 100. Moreover, additional components, steps, or blocks, may be added to method 2000 without departing from the scope of the method.

Method 2000 can begin at block 2010, when the computing device receives input data, perhaps from a user from end-user network 320. The input data may be entered via a GUI similar to GUIs described in FIGS. 7A-7F. The input data may include one or more conditions which specify, for example, (i) which agent instances on end-user network 320 are due for coaching, (ii) how much coaching time each agent instance needs, (iii) a priority order in which agent instances need to be coached (e.g., high priority, medium priority, low priority), (iv) under what conditions agent instances can receive coaching sessions, and (v) whether any supervisor instances are available to administer a coaching session.

As an example related to (iv), the input data may indicate that an agent instance must be in an available state and not currently handling a communication in order to receive a coaching session. As another example related to (iv), the input data may indicate that an agent instance's upcoming work segment must be available in order to receive a coaching session, meaning that the agent instance should not be scheduled for an upcoming break or other conflicting activity. As yet another example related to (iv), the input data may indicate a minimum time between coaching sessions to ensure that a particular agent instance doesn't receive two coaching sessions back-to-back. With this, the computing device can offer a coaching session to another agent rather than repeat a session with the particular agent instance. As even yet another example related to (iv), the input data may indicate a maximum number of concurrent coaching sessions that are allowed at any given time. Other conditions for (iv) are also possible.

At block 2020, the computing device receives information from one or more systems on end-user network 320 to determine a current state of end-user network 320. For example, the computing device may receive data from communication distributor 324/workforce management server 326/monitoring component 1920 as described above, to determine the work segments/agent states for each agent instance on end-user network 320.

At block 2030, the computing device determines whether the conditions specified in (iv) of block 2010 are met by the current state determined in block 2020. If the conditions are met, method 2000 can proceed to block 2040. Otherwise, method 2000 may remain at block 2030 until the current state of end-user network 320 meets the conditions specified in block 2010.

In some embodiments, the decision at block 2030 may also depend on whether a supervisor instance is available to administer a coaching session. For example, if no supervisor instances are available, method 2000 may remain at block 2030 until a supervisor instance is available.

At block 2040, the computer device delivers, to the one or more agent instances specified from (i) of block 2010, a coaching session. Delivering a coaching session may include providing a communication interface between the one or more agent instance and a supervisor instance from end-user network 320. In some embodiments, if only a certain number of coaching sessions can be delivered, block 2040 may involve delivering a coaching session to the highest priority agent instances, as specified by (iii) in block 2010. In some embodiments, upon being delivered a coaching session, the one or more agent instances are automatically placed in a coaching auxiliary agent state on communicator distributor 324 such that they don't receive any new communications.

In some embodiments, an agent instance may need an immediate coaching session. In such a case, a supervisor instance from end-user network 320 may bypass the conditions of specified from (iv) of block 2010 and may deliver a coaching session directly to the agent instance at issue.

Figure 21:
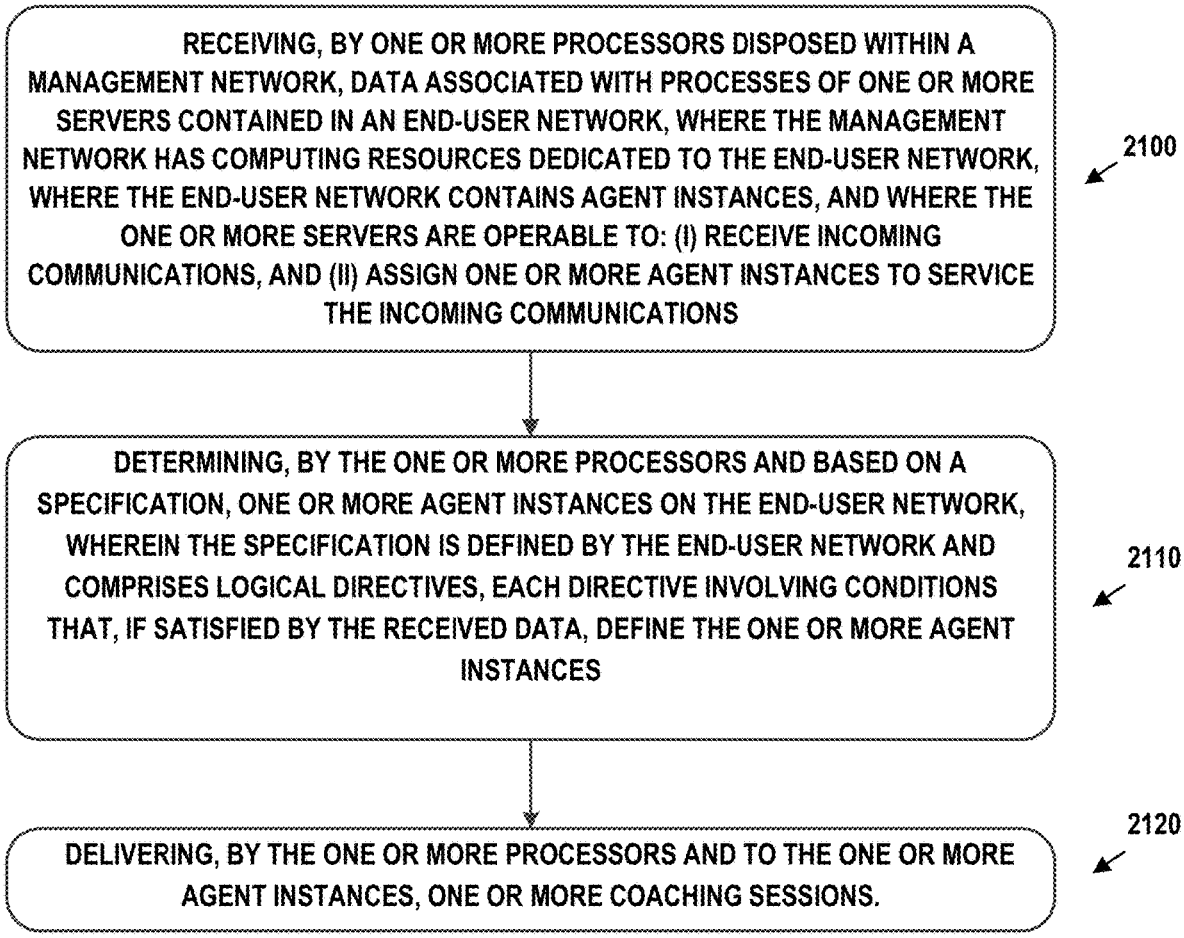
FIG. 21 is a flow chart illustrating an example embodiment.

FIG. 21 is a flow chart illustrating an example embodiment. The process illustrated by FIG. 21 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 21 may be simplified by the removal of any one or more of the features shown therein. Further, these embodiments may be combined with features, aspects, and/or implementations of any of the previous figures or otherwise described herein.

Block 2100 involves receiving, by one or more processors disposed within a management network, data associated with processes of one or more servers contained in an end-user network, where the management network has computing resources dedicated to the end-user network, where the end-user network contains agent instances, and where the one or more servers are operable to: (i) receive incoming communications, and (ii) assign one or more agent instances to service the incoming communications.

Block 2110 involves determining, by the one or more processors and based on a specification, one or more agent instances on the end-user network, where the specification is defined by the end-user network and comprises logical directives, each directive involving conditions that, if satisfied by the received data, define the one or more agent instances.

Block 2120 involves delivering, by the one or more processors and to the one or more agent instances, one or more coaching sessions.

In some embodiments, delivering the one or more coaching sessions comprises initiating one or more communication sessions between the one or more agent instances and one or more available supervisor instances disposed on the end-user network.

In some embodiments, the specification further comprises priority values for each of the one or more agent instances, and wherein communication sessions are only initiated between the one or more available supervisors and agent instances with high priority values.

In some embodiments, at least one of the conditions comprises a work segment condition, wherein an agent instance is defined by the work segment condition if the agent instance is in an available work segment.

In some embodiments, at least one of the conditions comprises a state condition, wherein an agent instance is defined by the state condition if the agent instance is currently in an available state.

In some embodiments, at least one of the conditions comprises a communication condition, wherein an agent instance is defined by the communication condition if the agent instance is not currently handling an incoming communication.

In some embodiments, upon being delivered a coaching session, an agent instance becomes unavailable to receive incoming communications.

In some embodiments, upon termination of a coaching session, an agent instance becomes available to receive incoming communications.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
one or more processors disposed within a management network, wherein the management network has computing resources dedicated to an end-user network, the end-user network containing agent instances and one or more servers, wherein the one or more servers are operable to: (i) receive incoming communications, and (ii) assign one or more agent instances to service the incoming communications, and wherein the one or more processors are configured to perform tasks including:
receiving, from the end-user network, operational data associated with the one or more servers contained in the end-user network,
determining, based on a specification, the one or more agent instances on the end-user network, wherein the specification is defined by the end-user network and comprises logical directives, each logical directive of the logical directives involving conditions that, if satisfied by the received data, define the one or more agent instances; and
delivering, to the one or more agent instances, one or more coaching sessions.

2. The computing system of claim 1, wherein delivering the one or more coaching sessions comprises initiating one or more communication sessions between the one or more agent instances and one or more available supervisor instances disposed on the end-user network.

3. The computing system of claim 2, wherein the specification further comprises priority values for each of the one or more agent instances, and wherein communication sessions are only initiated between the one or more available supervisors and agent instances with high priority values.

4. The computing system of claim 1, wherein at least one of the conditions comprises a work segment condition, wherein an agent instance is defined by the work segment condition if the agent instance is currently in an available work segment.

5. The computing system of claim 1, wherein at least one of the conditions comprises a state condition, wherein an agent instance is defined by the state condition if the agent instance is currently in an available state.

6. The computing system of claim 1, wherein at least one of the conditions comprises a communication condition, wherein an agent instance is defined by the communication condition if the agent instance is not currently handling an incoming communication.

7. The computing system of claim 1, wherein upon being delivered a coaching session, an agent instance becomes unavailable to receive incoming communications.

8. The computing system of claim 7, wherein upon termination of a coaching session, an agent instance becomes available to receive incoming communications.

9. A computer-implemented method comprising:
receiving, by one or more processors disposed within a management network, data associated with processes of one or more servers contained in an end-user network, wherein the management network has computing resources dedicated to the end-user network, wherein the end-user network contains agent instances, and wherein the one or more servers are operable to: (i) receive incoming communications, and (ii) assign one or more agent instances to service the incoming communications;
determining, by the one or more processors and based on a specification, the one or more agent instances on the end-user network, wherein the specification is defined by the end-user network and comprises logical directives, each logical directive of the logical directives involving conditions that, if satisfied by the received data, define the one or more agent instances; and
delivering, by the one or more processors and to the one or more agent instances, one or more coaching sessions.

10. The computer-implemented method of claim 9, wherein delivering the one or more coaching sessions comprises initiating one or more communication sessions between the one or more agent instances and one or more available supervisor instances disposed on the end-user network.

11. The computer-implemented method of claim 10, wherein the specification further comprises priority values for each of the one or more agent instances, and wherein communication sessions are only initiated between the one or more available supervisors and agent instances with high priority values.

12. The computer-implemented method of claim 9, wherein at least one of the conditions comprises a work segment condition, wherein an agent instance is defined by the work segment condition if the agent instance is in an available work segment.

13. The computer-implemented method of claim 9, wherein at least one of the conditions comprises a state condition, wherein an agent instance is defined by the state condition if the agent instance is currently in an available state.

14. The computer-implemented method of claim 9, wherein at least one of the conditions comprises a communication condition, wherein an agent instance is defined by the communication condition if the agent instance is not currently handling an incoming communication.

15. The computer-implemented method of claim 9, wherein upon being delivered a coaching session, an agent instance becomes unavailable to receive incoming communications.

16. The computer-implemented method of claim 15, wherein upon termination of a coaching session, an agent instance becomes available to receive incoming communications.

17. An article of manufacture including a non-transitory computer-readable medium, having stored thereon program instructions that, upon execution by one or more processors disposed within a management network, cause the one or more processors to perform tasks comprising:
   receiving data associated with processes of one or more servers contained in an end-user network, wherein the management network has computing resources dedicated to the end-user network, wherein the end-user network contains agent instances, and wherein the one or more servers are operable to: (i) receive incoming communications, and (ii) assign one or more agent instances to service the incoming communications;
   determining, based on a specification, the one or more agent instances on the end-user network, wherein the specification is defined by the end-user network and comprises logical directives, each logical directive of the logical directives involving conditions that, if satisfied by the received data, define the one or more agent instances; and
   delivering, to the one or more agent instances, one or more coaching sessions.

18. The article of manufacture of claim 17, wherein delivering the one or more coaching sessions comprises initiating one or more communication sessions between the one or more agent instances and one or more available supervisor instances disposed on the end-user network.

19. The article of manufacture of claim 18, wherein the specification further comprises priority values for each of the one or more agent instances, and wherein communication sessions are only initiated between the one or more available supervisors and agent instances with high priority values.

20. The article of manufacture of claim 17, wherein upon termination of a coaching session, an agent instance becomes available to receive incoming communications.

* * * * *